United States Patent Office 3,447,363
Patented June 3, 1969

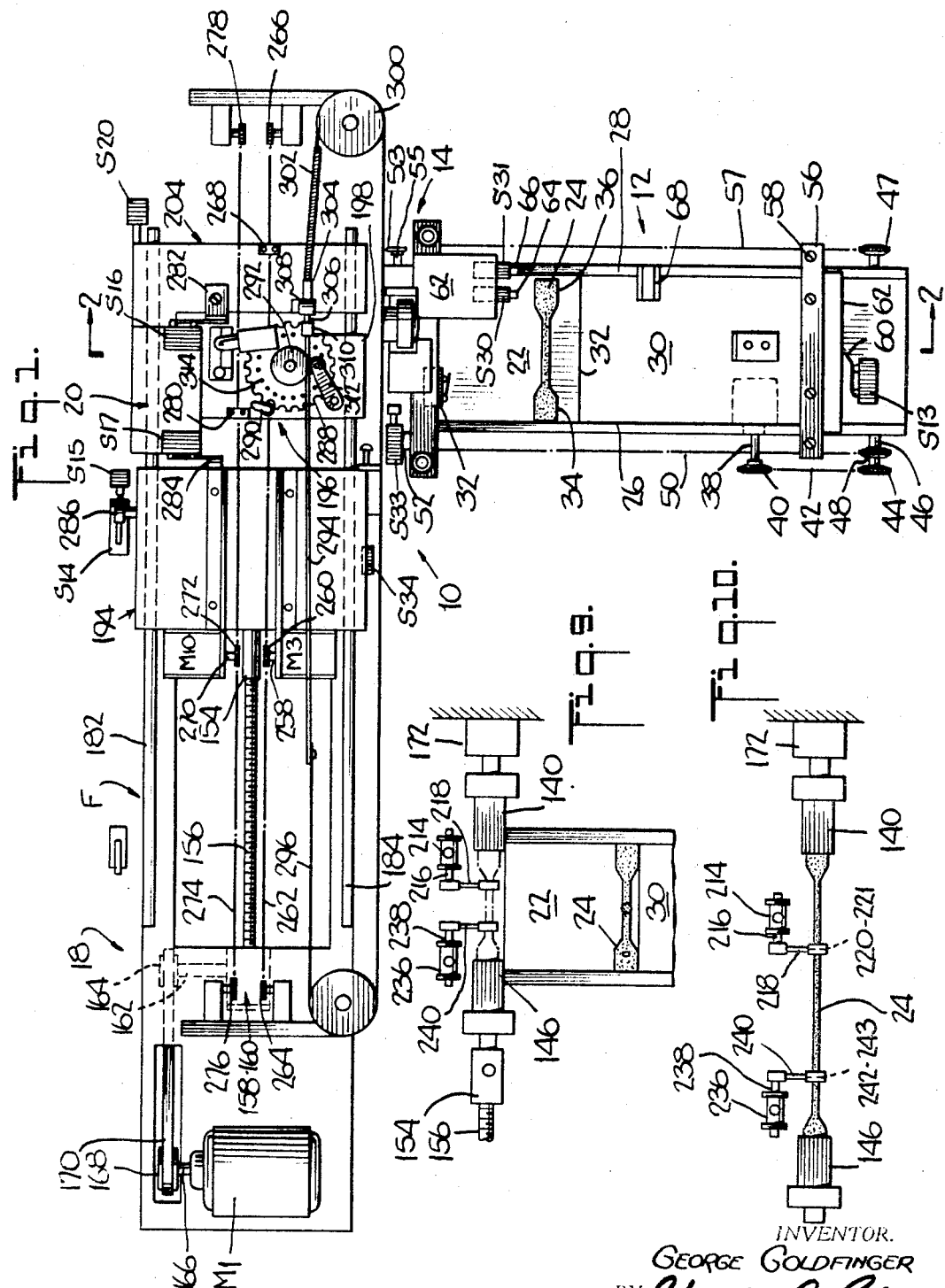

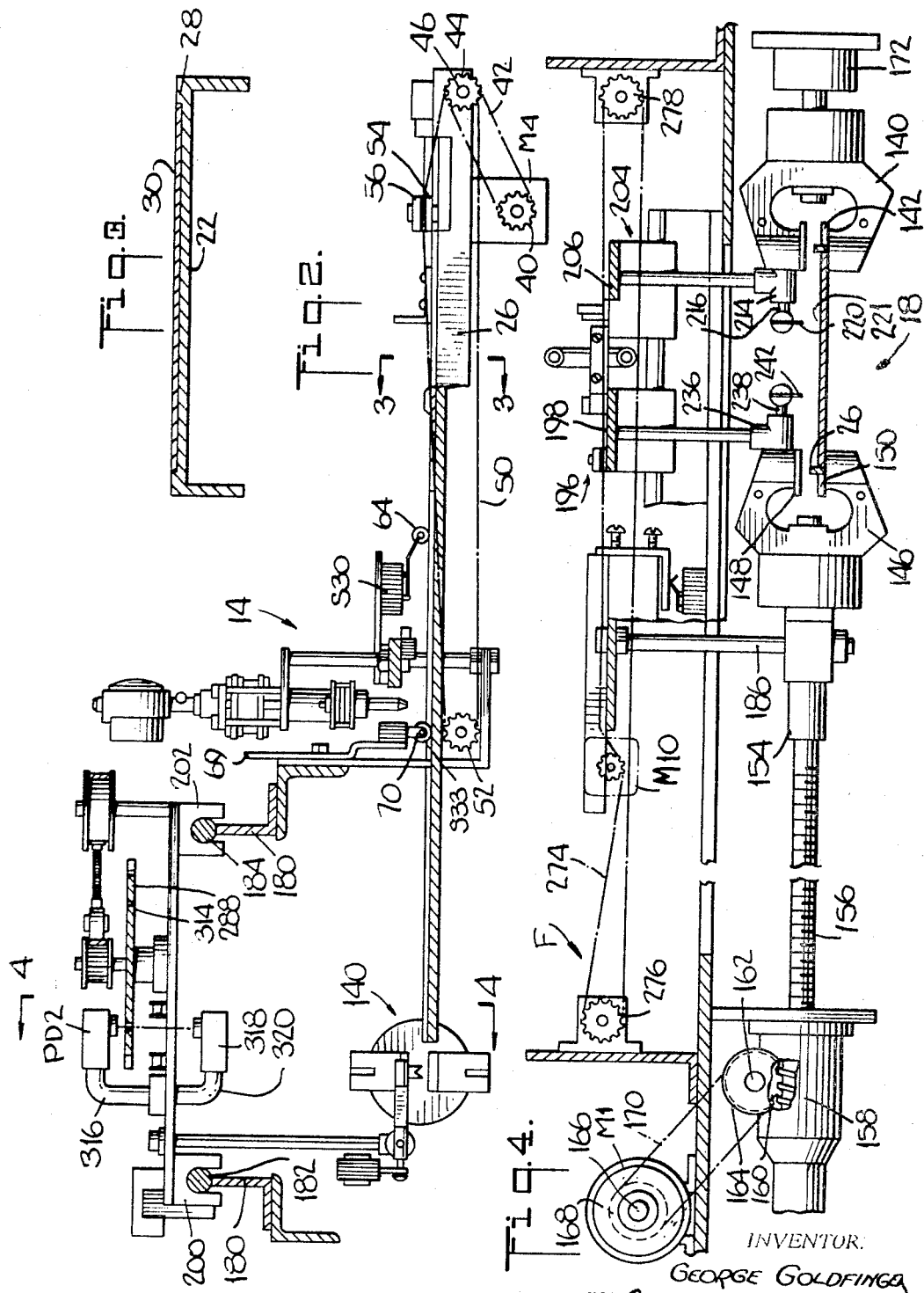

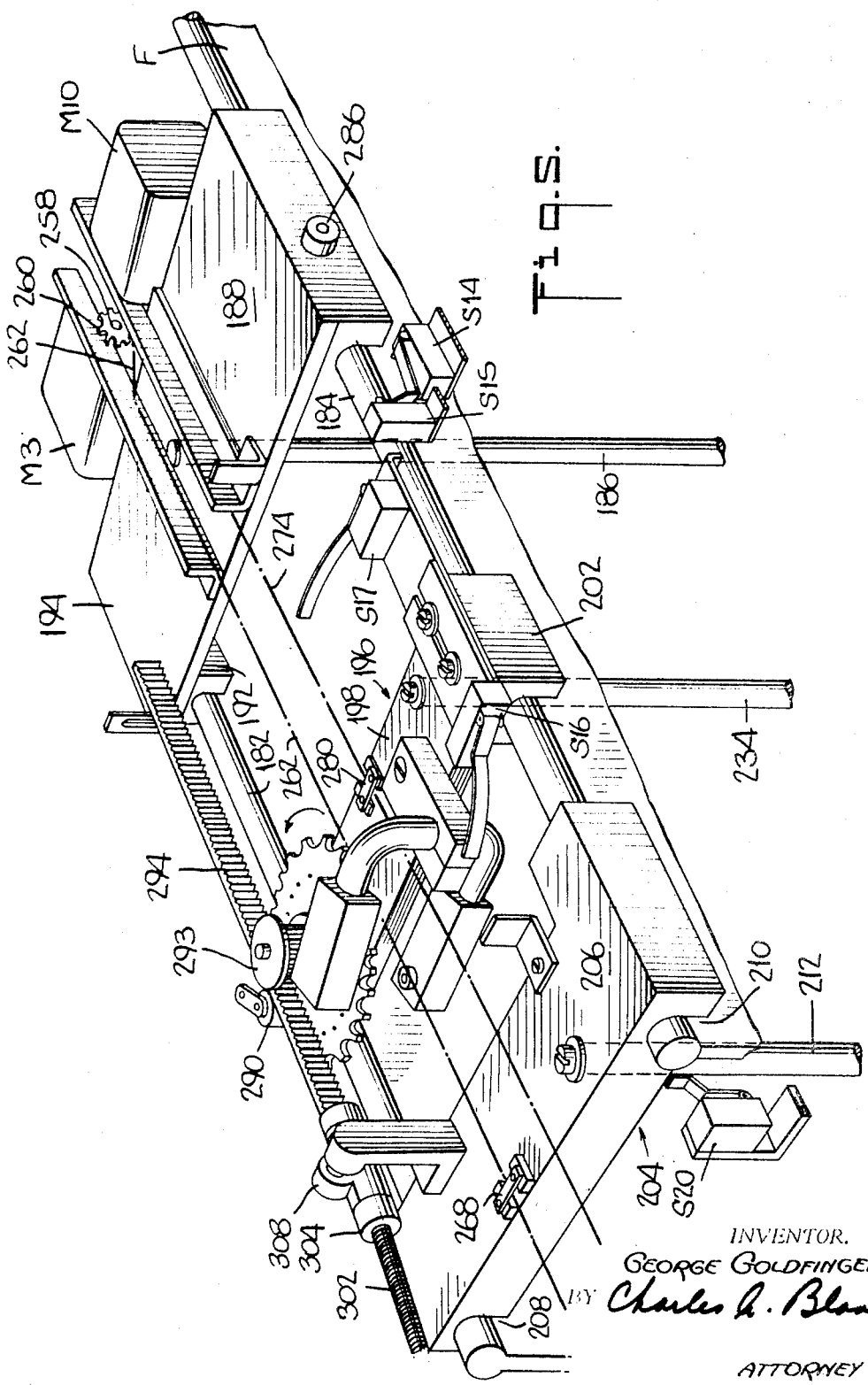

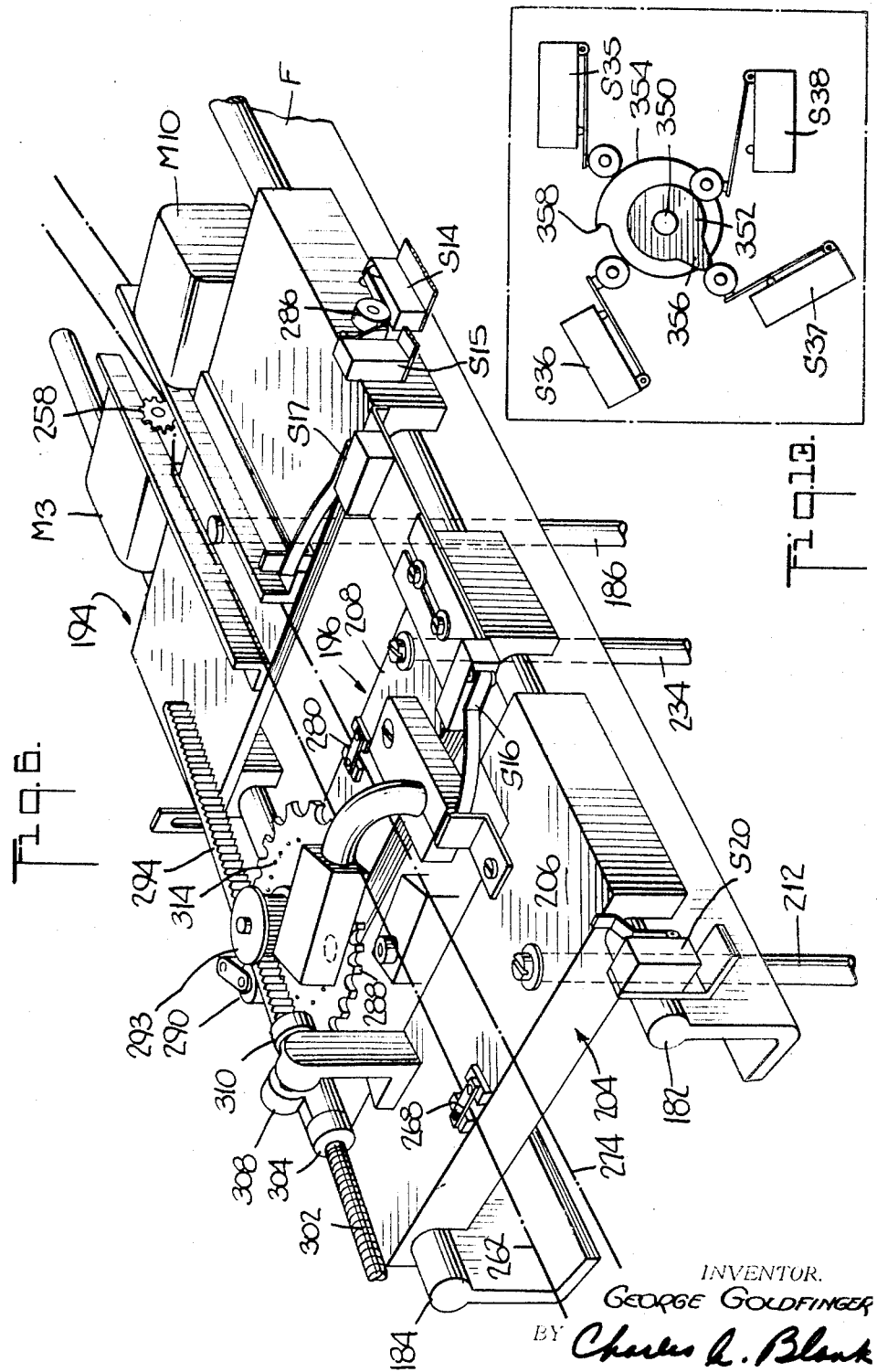

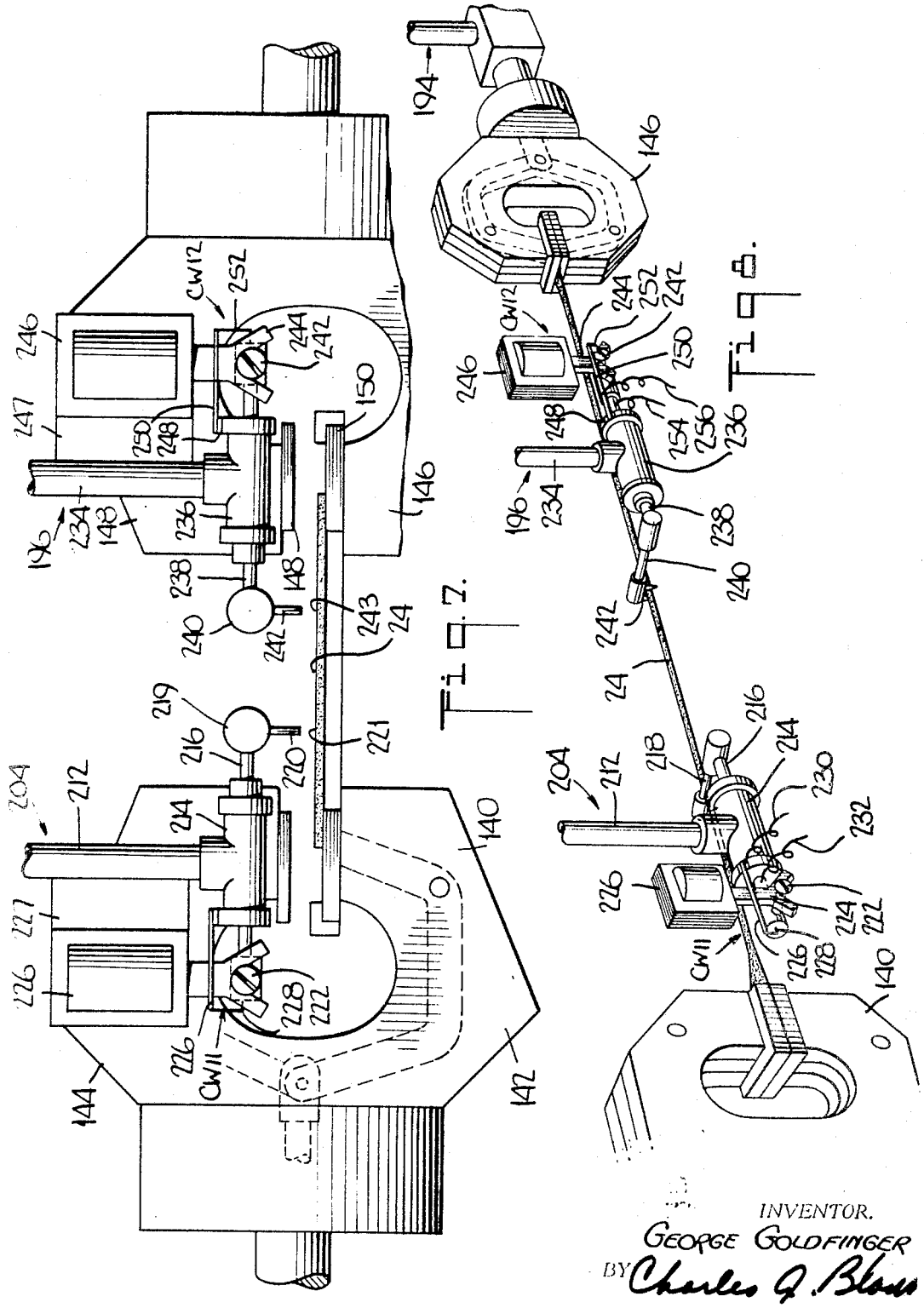

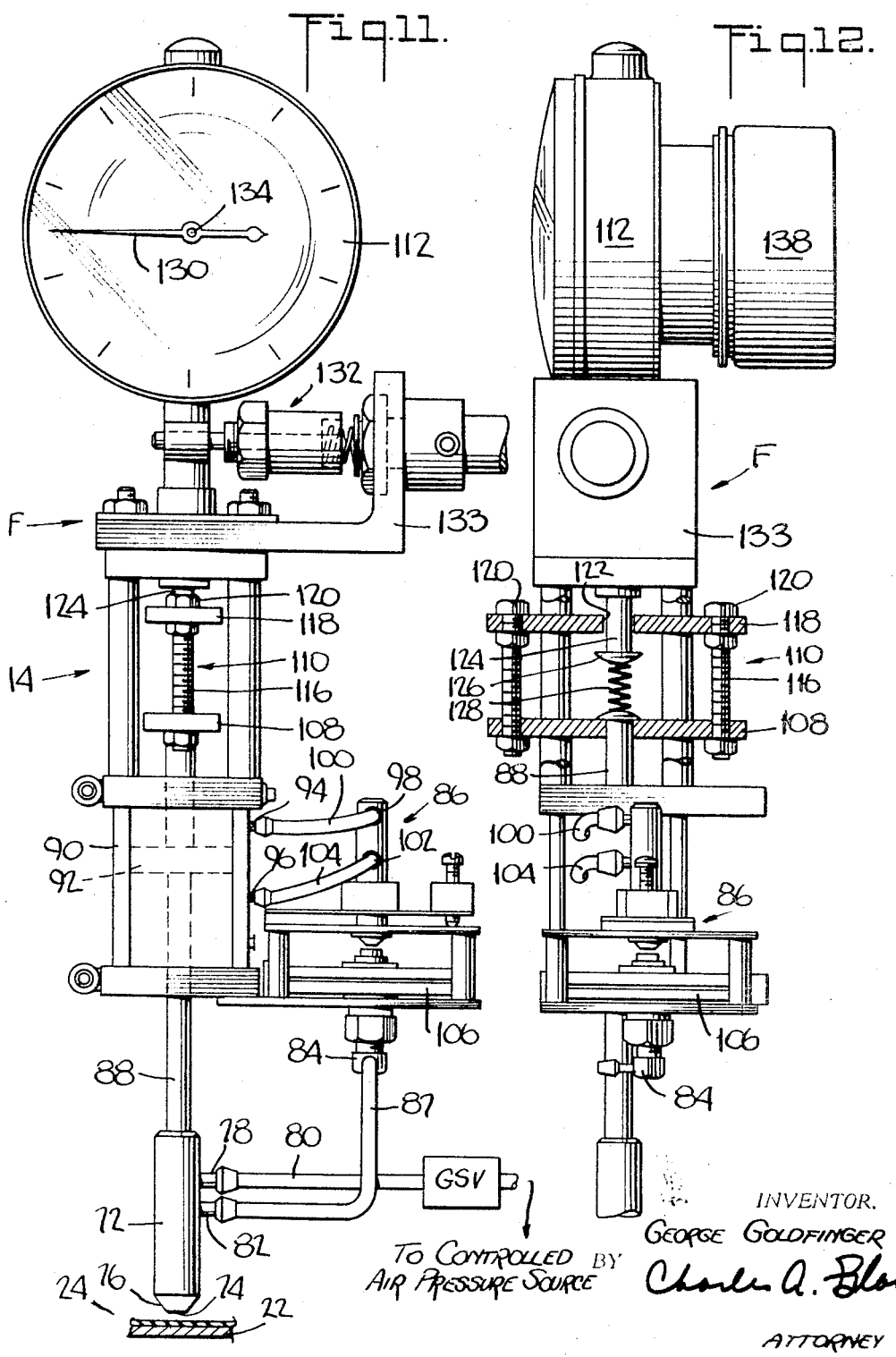

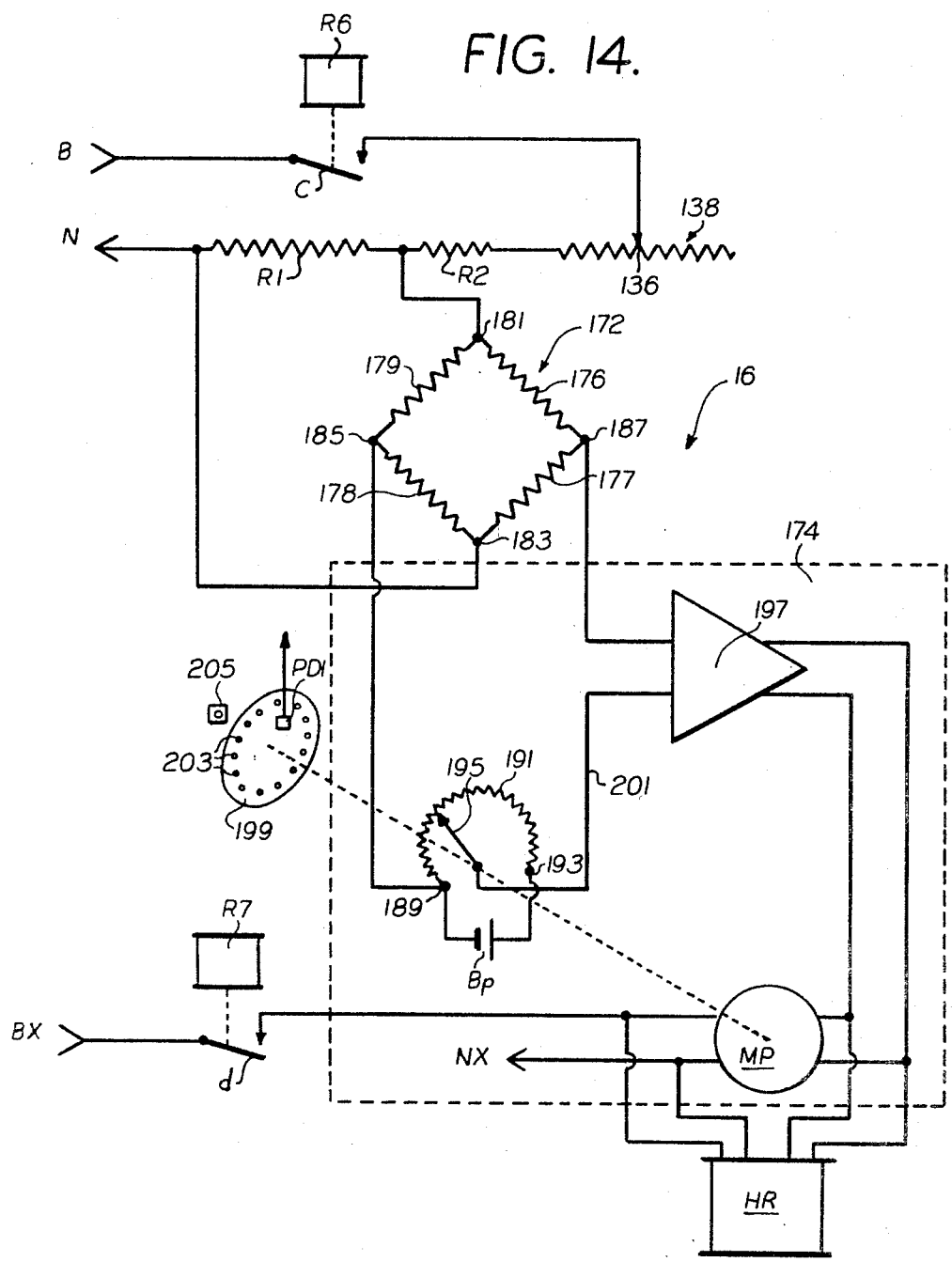

3,447,363
TENSILE TESTING APPARATUS
George Goldfinger, New Haven, Conn., assignor to Uniroyal, Inc., New York, N.Y., a corporation of New Jersey
Filed Aug. 11, 1966, Ser. No. 571,745
Int. Cl. G01n 3/08
U.S. Cl. 73—95                    17 Claims

ABSTRACT OF THE DISCLOSURE

Tensile testing apparatus particularly for use in testing highly stretchable materials, for example, cured rubber. The apparatus includes, for example, a resistance bridge for developing a resistance change representative of the stress-producing force. The apparatus also includes means responsive to the initial thickness of a test specimen of predetermined width for adjusting, for example, the input voltage to the bridge in accordance with the initial thickness of the specimen. The apparatus also includes, for example, means responsive to the resistance change and to the adjusted input voltage for indicating the stress on a test specimen.

---

This invention relates to a tensile testing apparatus and particularly to apparatus for the tensile testing of materials that exhibit a high degree of stretch such as, for example, cured rubber.

The main object of the present invention is the provision of a new and improved automatic apparatus for tensile testing.

Another object of the present invention is the provision of a new and improved automatic apparatus for tensile testing materials displaying a large amount of stretch, such as, for example, cured rubber.

Still a further object of the present invention is the provision of a new and improved automatic apparatus for tensile testing wherein there is automatic adjustment of the stress measuring apparatus in accordance with the cross-sectional area of the sample to be tested.

Still another object of the present invention is the provision of a new and improved automatic tensile testing apparatus designed to rupture a specimen to be tested in tension and to thereafter reset itself for a subsequent test on another specimen.

Yet a further object of the present invention is the provision of a new and improved tensile testing apparatus having means for measuring the amount of stretch which means is driven by motor means independent of the motor means providing the tension for stretching the sample.

Another object of the present invention is the provision of tensile testing apparatus having simple, inexpensive and automatic means for providing digitized data on the stress and strain of a highly stretchable test specimen.

Yet another object of the present invention is the provision of control apparatus for interrelating and controlling the multiplicity of machine elements forming the tensile testing apparatus of the present invention.

In accordance with the above objects of the present invention a tensile testing apparatus is provided for introducing therein a specimen to be tested, and for measuring the thickness of the specimen to adjust an automatic stress measuring apparatus in accordance therewith, and for automatically grasping such a measured specimen in jaws for holding the ends thereof, and for automatically stretching the grasped specimen by moving one of the jaws away from the other of the jaws, and for automatically measuring the unit elongation of the specimen by means which are driven by motor means independent of the stretching means, and for restoring the apparatus for a subsequent operation after the failure of the specimen in tension. Digitizing means are associated with both the stress and strain measuring means for providing a digitized output which is applied to decade type counters that record the stress and strain of the specimen during testing. The means for restoring the apparatus includes the means for resetting the counters to a zero reading prior to the next operation of the apparatus.

The above and other objects, characteristics and features of the present invention will be more fully understood from the following description taken in connection with the accompanying illustrative drawings.

In the drawings:

FIG. 1 is a top plan view of an automatic tensile testing apparatus embodying the present invention;

FIG. 2 is a sectional view taken along the line 2—2 of FIG. 1;

FIG. 3 is a sectional view taken along the line 3—3 of FIG. 2;

FIG. 4 is a sectional view taken along the line 4—4 of FIG. 2;

FIG. 5 is a perspective view of a portion of the apparatus particularly illustrating portions of the stretch measuring means during an actual measurement thereby;

FIG. 6 is a view similar to FIG. 5 showing the stretch measuring means in a position to commence a stretch measurement;

FIG. 7 is an elevational view, looking from the back of the machine, of the automatic jaws for gripping the tensile testing device and a portion of the stretch measuring apparatus or extensometer, both the jaws and stretch measuring apparatus being in condition prior to the gripping and engaging of the tensile specimen;

FIG. 8 is a perspective view of portions of the stretching apparatus and the stretch measurement apparatus as positioned during an actual test of a sample, looking from the back of the machine;

FIG. 9 is a top plan view of portions of the sample feeding mechanism, the stretching mechanism, and the stretch measuring mechanism, the latter two in condition to receive a sample, with certain portions of the apparatus deleted to more clearly illustrate the operation of the portions illustrated;

FIG. 10 is a view similar to FIG. 9 showing the condition of the stretching mechanism and the stretch measuring mechanism after a substantial stretch has been imparted to the sample;

FIG. 11 is a front elevational view of a thickness gauge for measuring the thickness of a sample prior to testing thereof;

FIG. 12 is a side elevational view of the gauge of FIG. 11;

FIG. 13 is an elevational view of motor driven cam control means which operates in conjunction with the thickness gauge of FIGS. 11 and 12;

FIG. 14 is a diagrammatic view of the circuit means and associated apparatus for determining the stress in a test sample and FIGS. 15A and 15B, when placed one above the other with FIG. 15A on top, constitute a schematic diagram of the control circuitry in the present invention.

Figure 15A:
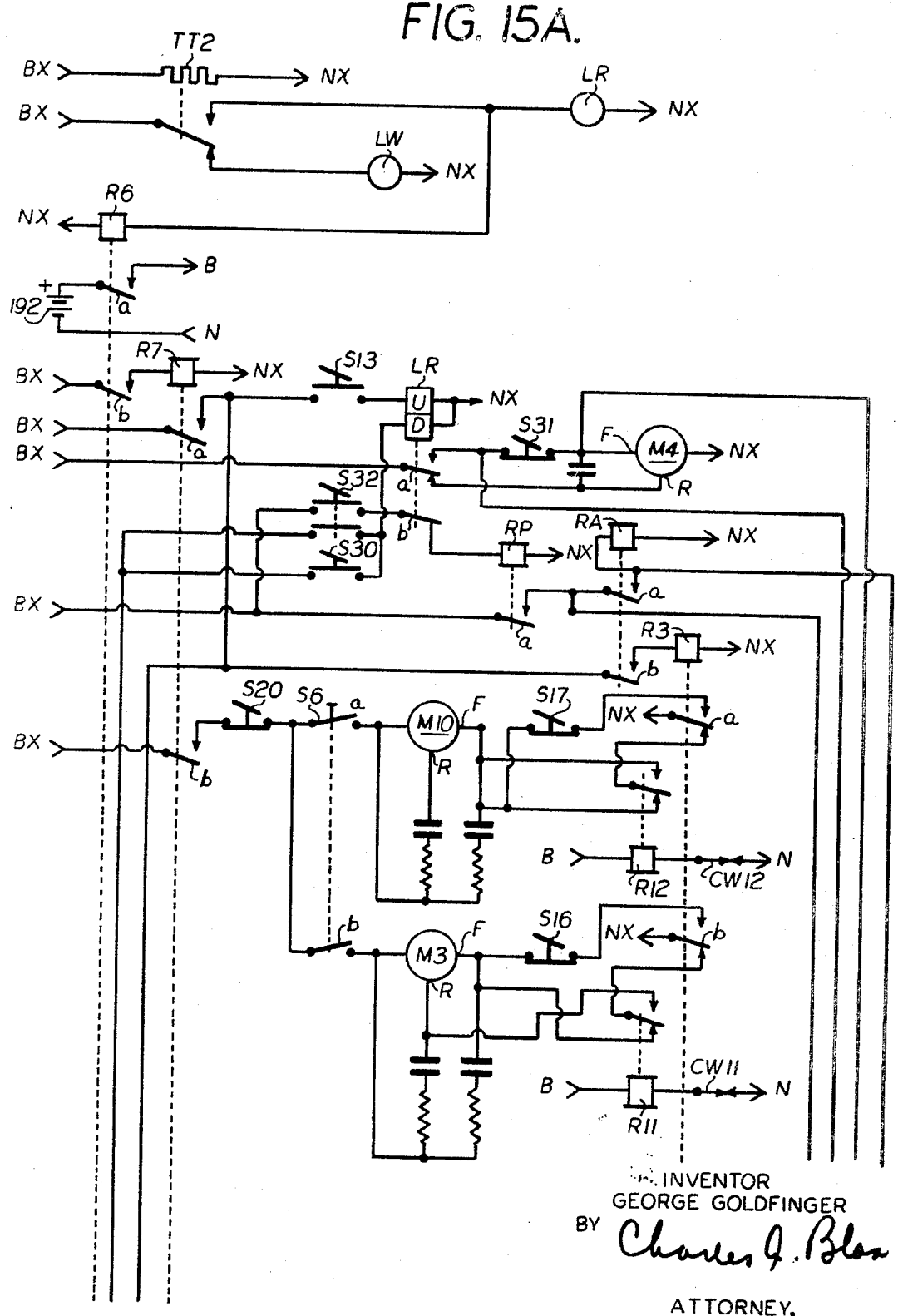

Referring now to the drawings in detail, the tensile testing apparatus 10 embodying the present invention comprises a specimen feed mechanism 12, a thickness gauging device 14, a stress measuring mechanism 16, a stretching mechanism 18 and an extensometer or stretch measuring device 20. The above catalog of components of the tensile testing machine 10 are interrelated by electrical control apparatus to be described subsequently in the present description so that the machine 10 operates in a prescribed sequence and avoids operation under certain prescribed circumstances.

The specimen feed mechanism

The specimen feed mechanism 12 comprises a horizontal table top 22 for supporting a sample or specimen 24, the table top being provided with a pair of upstanding sides 26 and 28 which are parallel and spaced apart a predetermined distance preferably just slightly larger than the preselected length of the test sample 24. For example, when using a standard dumbbell shaped rubber test sample of 4½ inches in length, the spacing between the sides 26 and 28 would be slightly larger than 4½ inches to receive the sample with slight clearance. It will be seen that the table surface 22 and the sides 26 and 28 form an elongated trough for receiving a transversely disposed sample 24.

Also disposed in the trough is a flat plate 30 which is adapted to slide back and forth on table top 22. The forward edge 32 of the plate 30 is adapted to engage the confronting edge portions 34 and 36 of the sample 24 and thereby push the sample 24 in the direction of the thickness gauge 14. To effect such sliding movement of the pusher plate 30, a reversible motor M4 is provided which motor is shown fixed to the frame F of machine 10 beneath the surface 22. The motor M4 has an output shaft 38 to which is fixed a sprocket 40. A chain 42 extends around the sprocket 40 and around a second sprocket 44 which is fixed to a rotatable shaft 46 mounted on the end of the side 26 which is enlarged for the purpose. Fixed to the opposite end of shaft 46 adjacent side 28 is a sprocket 47. Also fixed to rotatable shaft 46 adjacent sprocket 44 is a sprocket 48 that rotates in unison with the sprockets 44 and 47. Extending around sprocket 48 is an endless chain 50 which is rotatably mounted in the side 26 adjacent the thickness gauging device 14. Extending around sprocket 47 and around an idler sprocket 53 in axial alignment with sprocket 52 is an endless chain 57. Chains 50 and 57 are secured to the pusher plate 30 as by a pair of clamping bars 54 and 56 which are secured in clamping relation to the chains 50 and 57 and in fixed relation to the pusher plate 30 as by screws 58. Accordingly, movement of the chains 50 and 57 will impart concomitant movement to the pusher plate 30. Accordingly, when the motor M4 rotates in the "forward" (counterclockwise) direction, forward movement will be imparted to the pusher plate 30 to thereby push a sample 24 toward the thickness gauging device 14. Reverse or clockwise rotation of the motor M4 will cause the pusher plate to move toward the rear or remote end of the table surface 22 to thereby condition the feeding mechanism for the reception of a sample 24.

Various control devices are associated with the feeding mechanism 12 for controlling the motor M4 and other components of the apparatus as will be described in greater detail hereinafter. Suffice it to say at this point, there is provided at the rear or free end of the table 22 a limit switch S13 which is normally open but whose operating member 60 is engageable by the rear end 62 of pusher plate 30 to close the switch S13 when the pusher plate 30 is moved to its most retracted or rearmost position. As will be understood more clearly hereinafter, the closing of switch S13 conditions the motor M4 for forward movement. A pair of microswitches S30 and S31 are mounted on a fixed plate 62 with their operating members 64 and 66 in position to be engaged by an upstanding switch actuator 68 which is secured to and movable with the pusher plate 30 when the pusher plate has advanced to a position where the sample would be located for thickness gauging by the thickness gauge 14. Switches S30 and S31 are normally open but are closed by engagement with the switch actuator 68. In addition, a microswitch S33 is mounted on a fixed support member which is secured to the fixed frame F of the device. Switch S33 is normally open but is operated to its closed position when its operating member 70 is moved upwardly by a specimen 24 moving thereunder. As will be spelled out in more detail subsequently, microswitches S30 and S31 control motor M4 and are adapted to condition it for reversal upon operation of the switches. In addition, microswitch S33 is adapted to condition the gauging device 14 for gauging upon the switch S33 sensing the presence of a specimen 24.

Through the switches S13, S30, S31, S33 and other control elements to be described hereinafter, the motor M4 is adapted through its chain and sprocket drive to move the pusher plate 30 to a retracted position and thence to move it forward to position a sample disposed on the table surface 22 in position to be gauged. After gauging, the motor M4 is reenergized to further advance the specimen 24 to move it into the extensometer or stretching apparatus 18 where the automatically operated jaws will be closed to condition the device for actual stretching.

Thickness gauge

As will be described in greater detail hereinafter, the means for measuring the stress on the specimen 24 during testing is an ordinary load cell having a strain gauge bridge therein, which load cell actually measures the stretching force on the specimen. Since stress is equal to force divided by area, it will be obvious that if the cross-sectional area of the specimen is known, the measured force can be converted to stress.

While the width of the specimen is easily controlled by careful forming of the specimen, it has been found that there is a significant variation from specimen to specimen with regard to the thickness thereof. This variation of thickness will yield a significant error in stress calculation. The thickness gauge is provided in the present apparatus to measure the thickness of a specimen and to modify the stress measuring apparatus in accordance with such thickness measurement in order to yield a true stress calculation. The gauging device is most clearly shown in FIGS. 11, 12 and 14.

While any suitable thickness gauge may be used, the presently preferred gauge is of the pneumatic type. Referring now to FIGS. 11 and 12, the thickness gauge 14 includes a hollow position sensor vessel 72 which has a small opening 74 at the tapered bottom 76 of the vessel. The vessel has an inlet 78 which is connected to a controlled air source by a hose 80, and an outlet 82 which is connected to the inlet 84 of a pneumatic servo 86 by a hose 87. The vessel 72 is mounted on the lower end of a piston rod 88 which extends through a cylinder 90 and has fixed thereto within the cylinder a piston 92. Cylinder 90 is provided with an inlet 94 above piston 92 and an inlet 96 below piston 92. Inlet 94 is connected to a controlled outlet 98 on the pneumatic servo 86 as by a hose 100 and inlet 96 is connected to an outlet 102 on pneumatic servo 86 as by a hose 104. The pneumatic servo includes an expandable diaphragm 106, the interior of which is in communication with the inlet 84. Depending upon the amount of pressure exerted on the interior of the diaphragm 106, the diaphragm will expand and contract to thereby open and close the valves which control the flow of air through the outlets 98 and 102 respectively. When air is permitted to flow out through outlet 98 and hose 100 and into cylinder inlet 94, that air will tend to force piston 92 downwardly. When air is permitted to flow out through outlet 102 and hose 104 and into cylinder inlet 96 below piston 92, the piston will be caused to move upwardly.

As previously stated, vessel 72 is provided with air from a controlled air source through a solenoid valve GSV. That is, the pressure supplied to the inlet 78 for vessel 72 is predetermined. Depending upon how far the tapered bottom 74 is spaced from a surface underlying it (shown to be specimen 24 in FIG. 11), more or less air in vessel 72 will flow out through opening 74. If more air is flowing out through opening 74 than is normal or predetermined, then the pressure at outlet 82 of vessel 72 will be below normal whereby to cause the capsule 106 to contract. If the bottom 76 of the vessel 72 is unduly close to its underlying surface then the pressure at the outlet 82 will rise due to the fact that less air is able to escape through the opening 74, which rise in pressure will result in an expansion of the capsule 106. When the capsule 106 is expanded, which, as already noted, results from the bottom 76 of vessel 72 being too close to its underlying surface, the valve controlling outlet 102 will be opened to supply air to the cylinder 90 below piston 92 and thereby raise the piston and vessel 72 along with it. This movement will continue until the spacing between the bottom of vessel 72 and the underlying surface is such as to cause a predetermined outflow of air through the opening 74 at which point the pressure in outlet 82 will be such as to close off the valve controlling outlet 102 and thereby discontinue supplying air to move the piston 92 upward. However, there will be no opening of the valve controlling the outlet 98 so that there will be no downward movement. This will leave the bottom of the vessel 72 positioned a proper distance above the surface of specimen 24.

With such a device it will be obvious that the thickness of specimen 24 can be measured by setting a gauge to read zero when only the supporting surface 22 is confronting the bottom 76 of the vessel 72 and the position of the vessel is stabilized thereabove. If that setting is zero, when a specimen 24 is moved underneath the bottom of the vessel 72, the vessel 72 will be caused to move upwardly by the piston and cylinder arrangement previously described to restore the spacing between the bottom of the vessel and its underlying surface whatever that may be. The amount of upward movement will be equal to the thickness of the interposed specimen.

Piston rod 88 extends through cylinder 90 and is secured to a lower crosspiece 108 of a connecting means 110 between the piston rod 88 and the dial instrument 112. The connecting means 110 further includes a pair of bolts 114 and 116 which extend upwardly from the lower crosspiece 108 and are secured to an upper crosspiece 118 as by nuts 120. It will be obvious that the crosspieces 108 and 118 together with the bolts 114 and 116 move as a unit with the piston rod 88. Provided in the upper crosspiece 118 is an aperture 122 through which slidably extends a shaft 124 having a stop means here shown as a head 126. The head 126 is secured to the lower crosspiece as by a compression spring 128 for reasons which will become apparent hereinafter. The shaft 122 is operatively connected to the pointer 130 of the dial instrument 112 to cause that pointer to rotate in response to vertical movement of the shaft 124. Generally speaking the shaft 124 moves in unison with the piston rod 88, the spring being sufficiently stiff to maintain the connection. However, at times, it is necessary to move the piston rod relative to the shaft 124 and this is the purpose for the connecting means including the spring 128.

Specifically, the pressure gauge 14 also includes a brake mechanism 132 mounted on a support 133 fixed to the frame F, which brake is adapted to engage and hold the shaft 124 when actuated. This braking action will hold the pointed 130 in a fixed position to give a visual readout of the thickness of a specimen which has been measured. In response to control apparatus to be described subsequently, after the thickness measurement is completed, the brake mechanism 132 is actuated by the operation of a pneumatic valve GSB to hold the shaft 124 fixed and to supply air to the cylinder 90 below piston 22 and thereby move the vessel 72 upwardly away from the specimen 24 which has been measured. The purpose of this retraction is to move the vessel sufficiently far above the specimen so that the vessel will not interfere with subsequent operation of the apparatus as will be described. When the vessel 72 is moved upwardly, there must be relative movement between the piston rod 88 and the shaft 124. The connection between them being resilient, namely the compression spring 128, such motion is permitted to thereby enable the retraction of the vessel without changing the setting on the gauge 130.

It is important that the gauge 112 be maintained in a fixed position as coupled to the shaft 134 on which the pointer 130 is mounted in the moving element or slide 136 of a variable resistor 138 that is mounted on the back of the dial instrument 112. Accordingly, the slide 136 of the variable resistor 138 is moved in accordance with the thickness of the specimen 124. This adjustment of resistance is employed to adjust the output of the force measuring device in the tensile testing machine, which force measuring device is designed to provide an output proportional to stress as will be described in detail hereinafter.

The stretching mechanism

After the thickness of the sample 24 has been measured by the thickness gauge 14, circuit means to be described subsequently, will be actuated to re-energize motor M4 in a forward direction to advance the sample 24 into the stretching mechanism 18. The stretching mechanism includes a stationary jaw 140 having a pair of relatively movable jaw members 142 and 144 which are pneumatically operable between a closed position in which an end portion of the specimen 24 is grasped, and an open position in which the specimen may be moved into position between the two jaw members 142 and 144. A second jaw 146 is also provided with a pair of relatively movable jaw members 148 and 150 which jaw members are movable by a pneumatically controlled mechanism between closed gripping position and an open position. The jaw 140 is stationary and is mounted by a rod or shaft 152 onto a load cell 172 having electrical resistors arranged in a bridge circuit to detect the load or stress on a specimen 24 being tested. The load cell will be described in greater detail hereinafter. The movable jaw 146 is fixed to a crosspiece 152 which carries an internally threaded member 154 threadedly mounted on a rotatable lead screw or threaded shaft 156. The shaft 156 is in turn fixed to a worm 158 which is engaged by a worm wheel 160 that is mounted on a rotatable shaft 162 carrying a sprocket or pulley wheel 164. Fixed to the frame F adjacent sprocket or pulley wheel 164 is a main drive motor M1 having an output shaft 166 on which is mounted a sprocket or pulley wheel 168. Extending around both sprockets or pulley wheels 164 and 168 is a chain or belt 170 to drive shaft 162 in response to rotation of the output shaft 166 of motor M1. Rotation of the pulley wheel 164 will impart rotation to shaft 162 and worm wheel 160 to thereby rotate worm 158 and lead screw 156 to impart longitudinal movement to the movable jaw 146. The direction of rotation of motor M1, which is controlled by various switches and relays in a manner to be described hereinafter, will determine the direction of movement of the movable jaw.

Stress measurement

Referring now to FIG. 14, means 16 for measuring the stress to which the specimen 24 is subjected by the stretching means 18 is illustrated in a schematic fashion. The stress measurement is accomplished by the load cell 172 in combination with a self balancing potentiometer 174. The load cell 172 comprises four resistors 176, 177, 178 and 179 which are connected in a bridge having input terminals 181 and 183 and output terminals 185 and 187. As is customary in load cells, the four resistors 176, 177, 178 and 179 are fixed on an elastically deformable plate which is connected to the stationary jaw 140 and is deformed by the force applied to the jaw by the specimen 24 being stretched by the movable jaw. The deformation of the supporting plate of the load cell causes a change in resistance of the four bridge connected resistors 176, 177, 178 and 179 whereby to throw a balanced bridge out of balance and to thereby cause a voltage to appear across the output terminals 185 and 187. The output voltage appearing across the output terminals 185 and 187 is proportional to the force applied to the specimen 24 for stretching it.

However, as previously indicated in discussing the gauging mechanism 14, this output voltage is modified in accordance with the cross-sectional area (i.e. thickness) of the specimen in order that the output voltage appearing across the output terminals 185 and 187 be a true reflection of stress rather than force. This modification of output voltage for the load cell 172 is achieved by applying an input voltage to the bridge of the load cell 172 that varies inversely as the thickness of the specimen being tested. This is achieved by connecting the bridge input terminals 181 and 183 across a fixed resistor R1 which resistor is in series circuit with a current limiting resistor R2 and the variable resistor 138 that is varied in accordance with the thickness of the specimen as described hereinbefore. As the specimen 24 is increased in thickness the resistance of the variable resistor 138 is increased to thereby reduce the amount of current flowing through the series circuit which energizes the resistor R1, which circuit can be traced in FIG. 14 from the positive terminal B of a DC source, over the front contact $c$ of a "power on" relay R6, which is controlled in a manner to be described subsequently in this specification, through the variable resistor 138, the fixed resistor R2 and the fixed resistor R1 to the negative terminal N of the DC source. Accordingly, the voltage appearing across R1 will drop as the thickness of the specimen is increased whereby to reduce the input voltage by a factor dependent upon the thickness (and, therefore, the area) of the specimen. This reduction in input voltage will result in a concomitant reduction in the output voltage appearing across the terminals 185 and 187 whereby to cause the load cell bridge to put out a voltage proportional to stress rather than to force.

The output voltage of the load cell bridge is applied to a self balancing potentiometer 174. While the manner of connecting the load cell to the self balancing potentiometer can take a large number of different acceptable forms, for the purposes only of illustration and not by way of limitation, a simple means of interconnecting the two elements 172 and 174 to yield a digitized stress output is shown. In FIG. 14 the output terminal 185 of the load cell 172 is connected to a terminal 189 of the resistance element 191 of the self balancing potentiometer 174, which resistance 191 has a terminal 193 at its other end. Associated with the resistance 191 is a slide 195 which is driven by a motor MP. The slide 195 is connected by a wire 201 to the terminal 187 of the bridge of the load cell 172, an amplifier-chopper 197 being interposed in the wire or conductor 201 for reasons which will become apparent hereinafter. Connected across the terminals 189, 193 of the resistor 191 is a standard DC voltage source such as, for example, a battery $B_p$. It will be seen that the output voltage from the load cell 172 which is applied between the bridge terminal 187 and the slide 195 is applied in opposition to that portion of the voltage of the battery $B_p$ appearing across that portion of the resistor 191 extending between the terminal 189 and the slide 195. When these voltages are in balance no current will flow through the conductor 201. However, if the output voltage of the load cell 172 exceeds that portion of the battery voltage, then current will flow from the load cell toward the slide 195 through the conductor 201. Conversely, if the portion of the voltage from the battery $B_p$ appearing between the terminal 189 and the slide 195 is greater than the output voltage of the load cell 172, current will flow from the slide 195 towards the bridge terminal 187. The current flowing through the conductor 201 as already noted, flows through amplifier-chopper 197, the amplifier of which is a current amplifier. The amplified output from the amplifier 197 is chopped by the chopper therein whereby to yield an AC current output from the amplifier-chopper 197. This output is applied to the stator of the potentiometer motor MP, although it could be applied to the rotor thereof, if desired. Assuming the stator is energized by the output of the amplifier-chopper 197 the rotor of the motor MP is energized by an AC circuit which may be traced from the terminal BX of an AC source, over a front contact $d$ of a "power on" relay R7, which relay is controlled in a manner to be described subsequently, through the rotor of the motor MP to the terminal NX of the AC source. Depending upon whether the current is flowing in one way or the other through the conductor 201, the phase of the voltage signals applied to the stator of motor MP will be either leading or lagging the voltage applied to the stator. In one direction the motor MP operates to move the slide 195 in a clockwise direction and in the other direction it moves the slide in a counter-clockwise direction. Movement continues by virtue of the energization of the stator and rotor of motor MP until the slide has been moved to a position where there is a balance between the two signals applied to that portion of the resistor 191 between the terminals 189 and the slide 195. When the voltage is balanced, current discontinues flowing in the conductor 201 and hence amplifier 197 puts out a zero current, and the motor MP will stop rotating.

In actuality, during the time a tensile test is being made, since the specimen is continually stretched further and further, the bridge is constantly being thrown out of balance with the standard DC voltage source emanating from the battery $B_p$, whereby to continually energize the motor MP to keep the slide 195 rotating in an effort to restore balance. Thus rotation of the motor MP is directly dependent upon the stress of the specimen 24. This being the case, a simple perforated disc 199 having a plurality of spaced apart apertures or perforations 203 arranged in a ciircular row is connected to the output shaft of the motor MP to rotate therewith in such a manner that the disc 199 will turn a number of degrees equal to the spacing between two adjacent apertures 203 for every increment of 10 p.s.i. of stress to which the specimen is subjected. By placing a light source 205 on one side of the disc 199 in register the path of movement of apertures 203, and by placing a photodiode PD1 or other photosensitive means on the other side of the disc in register with said aperture path of movement, an easy way of digitizing the stress to which the specimen 24 is subjected is achieved. That is to say, each time the disc 199 is rotated the angular distance between two adjacent apertures 203, light will pass through an aperture to actuate the photodiode PD1 which will thereby put out a signal. Thus, the photodiode PD1 will put out a signal for each 10 p.s.i. of stress. This output from the photodiode PD1 can be applied to simple decade counters which can thereby record the stress to which the specimen 24 is subjected at any given point in the operation of the stretching mechanism 18.

The extensometer

Affixed to upstanding portions 180 of the frame F of the machine 10 are a pair of longitudinally extending tracks 182 and 184 here shown to be in form of cylindrical rods. The tracks 182 and 184 are parallel to each other and extend transversely of the direction of movement of the pusher 30. Extending upwardly from the crosspiece 152 of the stretching mechanism is a rod or shaft 186 which has its upper end fixed to a horizontal plate 188 having a pair of depending grooved flanges 190 and 192 fixed thereto in spaced relation to one another so that they can seat on the cylindrical rod tracks 182 and 184 respectively in sliding relation therewith. The plate 188 and its grooved flanges 190 and 192 form a carriage 194 which is movable with the movable jaw 146 by virtue of the fixed connection therebetween through the rod 186.

A second slidable carriage 196 is mounted on the tracks 182 for sliding movement thereon. The carriage 196 includes a horizontal support plate 198 having a pair of depending grooved flanges 200 and 202 which are complementary to and slidably seated on the cylindrical rod tracks 182 and 184 respectively. A third movable carriage 204 comprising a horizontal plate 206 having a pair of grooves 208 and 210 which are adapted to slidably receive the rod tracks 182 and 184 respectively, is also provided. The three carriages 194, 196 and 204 are adapted to move along the tracks 182 and 184 in response to the stretching of the specimen 24 by stretching mechanism 18.

Fixed to plate 206 of carriage 204 and extending downwardly therefrom is a shaft 212 which supports a horizontal bearing member 214. Rotatably and slidably mounted in bearing member 214 is a shaft 216 which has affixed at one end thereof and extending at right angles thereto a rod 218 having a depending V shaped notched feeler 220 at its free end. Fixed to the opposite end of shaft 216 is a stud or screw 222 which is in engagement with a forked member 224 that is connected to the armature of a solenoid 226. When the solenoid 226 is energized, the armature thereof will move downwardly and move the forked member 224 downwardly against screw 222 to rotate the shaft 216 clockwise as viewed in FIG. 8 whereby to elevate the feeler 220. When the solenoid is de-energized the armature thereof will move upwardly, as by a spring bias or the like, and thereby permit the shaft 216 to pivot in a counter-clockwise direction under the urging of gravity, for example, to cause the feeler 220 to move downwardly onto a sample or specimen 24 to be or being tested.

Mounted on the bearing member 214 in electrically insulated relationship therewith is an arm 226 having a cats whisker contact member 228, supported thereby in position to be engaged by the free end of the shaft 216. A conductor 230 is electrically connected to the arm 226 and hence to the member 228. Another conductor 232 is electrically connected to the shaft 216 whereby to constitute a switch CW11 between the cats whisker member 228 and the shaft 216 for purposes which become apparent hereinafter. It will become obvious that the conductors 230 and 232 could be run through the hollow shaft 212 if desired and are shown extending freely from their points of connection merely for purposes of illustration.

Depending from the plate 198 of the carriage 196 is a shaft 234 supporting a horizontal bearing member 236 at the lower end thereof. Slidably and rotatably mounted in the bearing member 236 is a shaft 238 having a rod 240 secured thereto at right angles. Depending from the rod 240 is a V shaped feeler 242 adapted to engage the upper surface of a specimen 24 being tested. Extending radially from the shaft 238 at the end thereof remote from the rod 240 is a stud or screw 242 which is engaged by the forked end of an actuator member 244 that is connected to the armature of a solenoid 246. By control means to be described subsequently, when the solenoid 246 is energized, the member 244 will be moved downwardly to rotate the shaft 238 clockwise as viewed in FIG. 8 and thereby lift the feeler 242 off of the specimen 24. When the solenoid 246 is de-energized, its armature will move upwardly as by a spring bias thereby causing the member 244 to move upwardly to permit the shaft 238 to rotate in a counter-clockwise direction as by the urging of gravity.

Secured to the bearing member 236 in electrically insulated relation therewith as by an insulating wafer 248 is an arm 250 having a cats whisker contact member 252 at the free end thereof in position to be engaged by the adjacent end of the shaft 238. A conductor 254 is connected to the arm 250 in electrically conducting relation therewith and a second conductor 256 is connected to the shaft 238 whereby to form a cats whisker switch CW12. As was true with respect to the conductors 230 and 232, the conductors 254 and 256 need not extend freely away from their associated parts but could be drawn through the shaft 234 to their associated control apparatus.

In accordance with one feature of the present invention, the measurement of elongation of the specimen 24 is accomplished by associating the feelers 220 and 242 with two points 221 and 243 respectively on the specimen 24, and then by moving the feelers by independent motor means in the same direction and at the same speed as the associated points on the specimen, and then by measuring the relative movement between the two feelers which movement will be the same as the extension or stretching of the specimen between the two points 221 and 243. This result is achieved by providing two separate motors M3 and M10 which are arranged to move respectively the carriages 204 and 196 in accordance with the movement of the points 221 and 243 of the specimen 24 respectively associated with the feelers 220 and 242.

Specifically, motors M3 and M10 are fixed to carriage 194 which moves with the movable jaw 146 of the stretching mechanism. Fixed to the output shaft 258 of the motor M3 is a drive sprocket 260 which engages a continuous chain 262 that extends about an idler sprocket 264 fixed to the rear or lefthand end of frame F as viewed in FIG. 1 and thence around the idler sprocket 264 to a second idler sprocket 266 rotatably mounted on the frame adjacent the righthand thereof as viewed in FIG. 1. Chain 262 is clampingly secured to carriage 204 by a clamp 268 to cause the carriage 204 to move with the chain 262 and hence in response to rotation and movement of the motor M3.

Affixed to the output shaft 270 of motor M10 is a drive sprocket 272 which engages a chain 274 that extends rearwardly and thence around an idler sprocket 276 adjacent to sprocket 264 and thence forwardly over the frame to an idler sprocket 278 adjacent to sprocket 266 and thence back to the sprocket 272. Chain 274 is fixed to the carriage 196 as by a clamp 280. Accordingly, movement of chain 274 will impart movement to carriage 196.

Associated with the three carriages 194, 196 and 204 are a number of control switches in addition to the cats whisker contact switches CW11 and CW12 associated with the feelers 220 and 242 respectively. For example, a switch S20 is secured to the frame in a position to have its actuating member engaged by the righthand edge of of the carriage 204 (as viewed in FIG. 1) when that carriage is in its extreme righthand position on the tracks 182 and 184 which is the position in which the stretching operation begins. Switch S20 has a normally closed contact which is opened when the carriage 204 is in its rightmost position, as viewed in FIG. 1. Mounted on carriage 196 is confronting relation with the carriage 204 is a limit switch S16 that has a normally closed contact which is opened when the carriages 196 and 204 are in such close confronting relationship that the operating member of the switch S16 engaged an L-shaped actuation bar 282 on the carriage 204. Also fixed to the carriage 196 along its lefthand edge as viewed in FIG. 1 is a switch S17 which has an operating member adapted to engage an L-shaped actuation member 284 on carriage 194 when the carriages 194 and 196 are sufficiently close to effect the engagement. Switch S17 has a normally closed contact that is opened upon engagement of its operating member and the actuation member 284. Extending outwardly from the grooved flange 190 on the carriage 194 is a switch actuation member 286 which is adapted to engage the operating arm of a normally closed limit switch S14 that is fixed to the frame and also to engage the operating member of a safety switch S15 that is directly in the path of travel of the actuation member 286. As will become apparent hereinafter in this description, the switches associated with the various carriages are employed to control in part the operations of the motors M1, M3 and M10 as well as the motor M4 and other allied apparatus.

When a sample 24 is pushed by the pusher 30 in between the open jaws 140 and 146 of the stretching mechanism 18, the carriages 194, 196 and 204 are all in their rightmost position as shown in FIG. 1 and the solenoids 226 and 246 are energized by circuit means to be described subsequently so that the feelers 220 and 242 have been rotated upwardly out of obstructing or engaging relation with sample 24. Means are then actuated to close the jaws 140 and 146 and then to energize motor M1 to commence rotating the lead screw 156 to cause the internally threaded crosspiece 154 to move longitudinally of the lead screw and thereby impart motion to the carriage 194 and apparatus associated therewith including the motors M10 and M3. In a manner to be described hereinafter, simultaneously with the movement of the carriage 194 the solenoids 226 and 246 will be de-energized to cause the feelers 220 and 242 to move into engagement with points 221 and 243 respectively on the upper surfaces of the specimen 24 about to be tested. Preferably feelers 220 and 242 are spaced a unit distance apart, such as, for example, one inch, although this spacing is not necessary to the operation of the invention.

As carriage 194 and movable jaw 140 commence moving to the right as viewed in FIGS. 7 and 8, the specimen 24 will commence being stretched and, accordingly, the point 243 underlying the feeler 242 will commence moving to the right as well as the point 221 underlying the feeler 220. However, the point underlying the feeler 242 will move more rapidly to the right than the point underlying the feeler 220. Moreover, through chains 262 and 274 which connect carriage 194 to carriages 196 and 204, the carriages 196 and 204 will commence moving to the right at the same rate as carriage 194. Since the feelers 220 and 242 are moving more slowly to the right than are the carriages 196 and 204, both of the feelers will move to the left relative to carriages 196 and 204 as viewed in FIGS. 7 and 8. This relative movement to the left will cause a closing of the cats whisker contact CW11 and an opening of the cats whisker contact CW12.

The closing of the cats whisker contact CW11 will, as will be described subsequently, energize the motor M3 in such a direction as to move the carriage 204 to the left relative to the carriage 194 to retard the rightward movement of the carriage 204, as viewed in FIG. 7, to open the cats whisker contact CW11 and reverse the direction of the relative movement between the carriage 204 and its feeler 220. The reverse movement will continue until the contact CW11 is re-energized to start a subsequent cycle of operation. In this manner the carriage 204 will move to the right as viewed in FIGS. 7 and 8 substantially cocomitantly with the smooth rightward movement of the feeler 220 but with a slight reciprocating or hunting superimposed in the movement as just described.

The opening of the cats whisker contact CW12 as above described will cause a reverse operation of the motor M10 to move carriage 196 leftward relative to the carriage 194 to cause a closing of the contact CW12 whereupon the motor M10 will reverse and move the carriage 196 to the right at a rate more rapidly than the rightward movement of the feeler 242 to close the contact CW12 which closing will reverse the motor M10 and start a new cycle of operation of that motor. In this manner the carriage 196 will also move to the right as viewed in FIGS. 7 and 8 with a slight reciprocating or hunting movement in order to maintain its associated feeler 242 substantially fixed with respect to its carriage 196.

It will be understood that while the carriages 196 and 204 move to the right as viewed in FIGS. 7 and 8 with a slight hunting movement, they nevertheless will move at an average rate substantially identical to their smoothly moving associated feelers 220 and 242. Hence there will be relative movement between the two feelers 220 and 242 and between the carriages 204 and 196, respectively, which relative movement will be equal to the relative movement between the two points underlying the feelers 220 and 242.

Rotatably mounted on the horizontal plate 198 of carriage 196 is a scalloped wheel 288 having a spring pressed pawl 290 biased into engagement therewith. The pawl's bias is such as to permit the wheel 288 to rotate incrementally or in a step-by-step manner from scallop to scallop. Affixed to the scalloped wheel 288 is a sprocket 292 which engages a timing belt 294 which has its lefthand end as viewed in FIG. 1 fixed as by a rivet to a steel band or tape 296. Tape 296 extends around an idler roller 298 rotatably mounted on the frame F and thence to an idler roller 300 rotatably mounted at the other end of the frame and thence to the righthand end of a spring 302 which has its lefthand end secured to a bushing 304. Bushing 304 has a necked down central portion 306 that is slidably mounted in a bearing 308 that is mounted on the carriage 204 in fixed relation thereto. The lefthand end of the necked down portion 306 is integrally formed with a second bushing 310, which is secured to the righthand end of the timing belt 294 whereby to make a complete loop. It will be seen that the righthand end of the bushing 310 is spaced from the lefthand surface of the bearing member 308 to provide for some sliding movement between the bushings 304 and 310 and the bearing member 308 for reasons which will become apparent hereinafter. It will also be noted that a spring pressed roller 312 is pivotally mounted on the carriage 196 to engage the timing belt 294 and bias it into engagement with the sprocket 292.

As the carriages 196 and 204 commence moving to the left as viewed in FIG. 1, there will be a tendency for the sprocket 292 and the scalloped wheel 288 to turn due to the engagement between the sprocket 292 and the Timing belt 294, Timing being a trademark of Uniroyal, Inc., registered in the U.S. Patent Office. However, this tendency to turn will be resisted by the spring pressed pawl 290 until the torque exerted by the belt 294 on the sprocket 292 exceeds the resisting torque exerted on the scalloped wheel 288 by the spring pressed pawl 290, at which point the scalloped wheel and the sprocket 292 will rotate an angular distance equal to the distance between two adjacent scallops. When this happens, the spring 302 will cause the bushings 308 and 310 in their intermediate shaft 306 to slide to the right through bearing member 308. Continued movement of the carriage 196 will again commence building up a turning torque on the sprocket 292, which turning torque will be relieved by virtue of the leftward movement (as viewed in FIG. 1), of the carriage 204 which movement will cause the bearing member 308 to slide over the thinned down portion 306 between the bushing 308 and 310. At a certain point in the relative movements of the two carriages the torque on the scalloped wheel will once again be sufficient to overcome the resisting torque from the pawl 290 and the wheel will rotate another angular distance equal to the spacing between two scallops.

Associated with the scalloped disc 288 are a multiplicity of small apertures 314 arranged in a circular row. Disposed above the wheel 288 in register with the path of travel of the apertures 314 is a photodiode or other photosensitive means PD2, which is held in the described position by a suitable supporting arm 316. Disposed beneath the scalloped wheel 288 also in register with the path of movement of the apertures 314 is an electric light bulb 318 held in its described position by a suitable supporting arm 320. Each time the scalloped wheel rotates the angular distance between two scallops, an aperture passes between the light bulb 318 and the photodiode PD2, whereby to cause an electric pulse to be generated by the photodiode. Thus it is possible to obtain a digitized output of strain or elongation of the specimen 24 which elongation is directly represented by the relative movement between the carriages 196 and 204 and which relative movement imparts a proportional rotation to the scalloped wheel 288. Preferably, the spacing between the aperatures 314 is such as to represent a relative movement between the carriages of .1 inch, which, of course, is equal to an elongation between the two points 221 and 243 on specimen 24 of .1 inch.

The purpose for the step-by-step rotation of the scalloped wheel 288 is to eliminate any possible malfunction of the digitizing apparatus including the bulb 318 in the photodiode PD2 which might arise if the scalloped wheel 288 were permitted to rotate in a smooth continuous manner. If such smooth rotation were permitted, it is conceivable, that the photodiode might put out a multiplicity of pulses for the passage of a given single aperture 314 thereunder. This is especially true in view of the hunting nature of the movement of carriages 196 and 204. By providing for a step-by-step rotation of the wheel 288, this possibility is eliminated as the apertures move very rapidly past the photodiode and electric bulb to assure the generation of a single discrete pulse for each aperture, and hence for each .1 inch elongation of specimen 24 between points 221 and 243.

*Digital readout*

As has already been described in this specification, during the testing of a specimen 24 both the stress and the strain of the specimen are measured and means are included for converting those measurements to a digital output. The particular means for responding to the digital output can be any of a wide variety of readout means as may suit the user of the particular machine. A specific readout means forms no part of the invention per se.

However, in testing rubber specimens or the like, where it is desirable to obtain readings of the stress in the specimen at 100% elongation, and at 200% elongation and at 300% and 400% and 500% elongation, as well as at rupture or failure of the specimen, I have found that simple decade display counters are very convenient to use. When using such counters, I provide one counter that gives a readout of elongation per se. The counter is a digital counter having two columns to display elongations in 10% increments up to 990%.

Ganged with the elongation or strain counter just described are banks of stress counters that work in unison and are controlled directly or indirectly by the strain or elongation counter. As a specimen is being tested, the output from the stress digitizer is fed to each of the five stress counters. Each records the same digitized stress output at the same time until the elongation counter records an elongation of 100%. As the elongation counter reaches the 100% display, circuit means are actuated to de-energize the first of the stress counters whereby that counter discontinues counting but continues to display the recorded stress at 100% elongation. The remaining stress counters continue to count in unison. When the elongation counter reaches a display of 200%, then the second stress counter discontinues counting but continues to display the stress of the specimen at 200% elongation. The remaining counters continue to count in unison. At 300% elongation the third stress counter will discontinue counting and continue to display the stress at said 300% elongation. The simultaneous counting of the stress counters that have not discontinued by virtue of their having reached their predetermined cutoff points based upon elongation will continue until the specimen breaks.

Figure 15B:
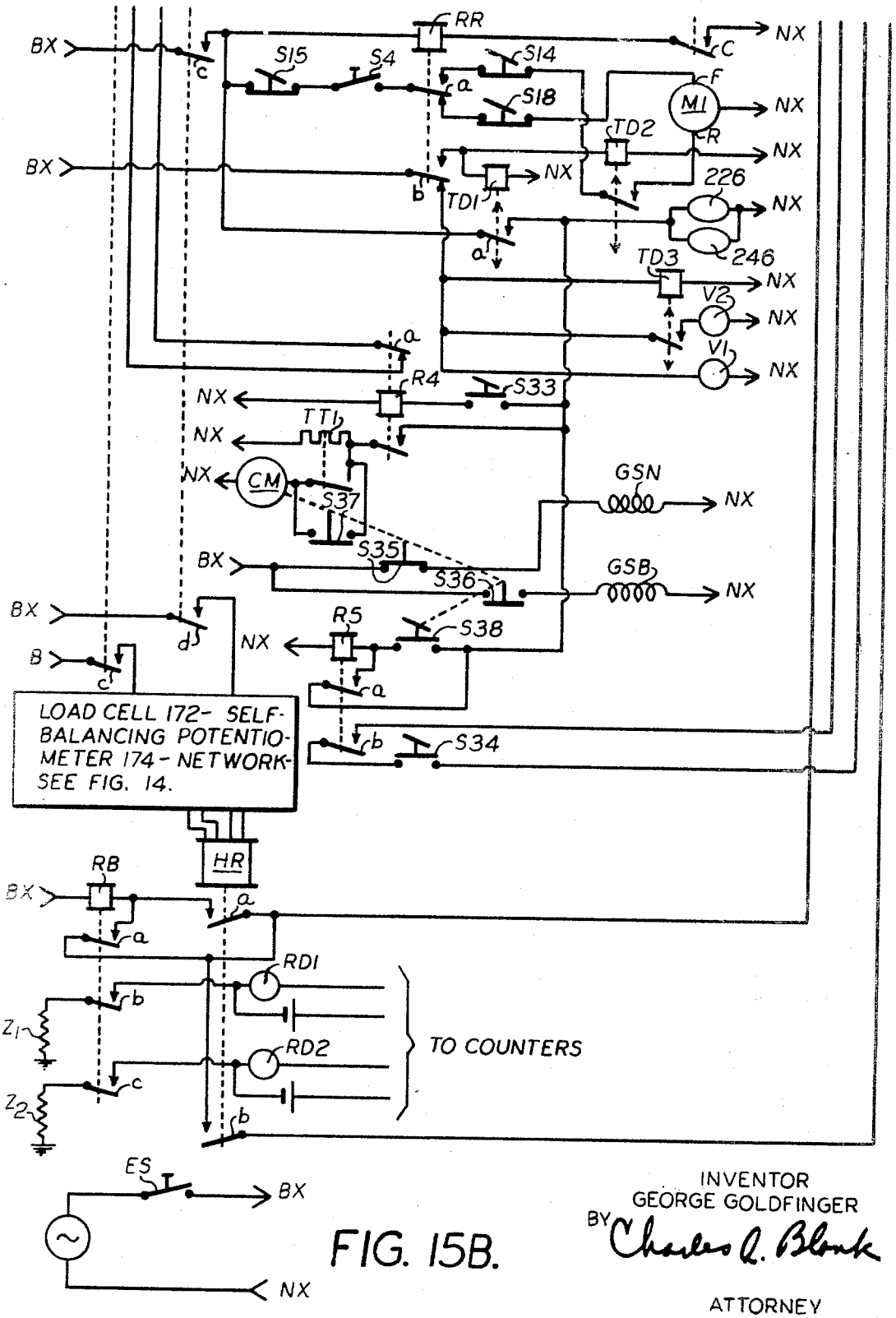

Upon the specimen 24 breaking, a phase sensitive relay HR (FIG. 14) will operate and among a number of functions which the operation of the relay HR will perform will be the discontinuance of further counting by virtue of the connection into each photodiode circuit of a low impedance ground (FIG. 15). Moreover, if the elongation of the specimen failed to achieve, for example, 400%, the counters designed to display the stress at 400% elongation and at 500% elongation will be cleared by the operation of the relay HR so that they will display no data which might lead an observer to believe that there was a measured 400 or 500% elongation.

Thus upon the failure of the sample, the strain or elongation counter will display the elongation at break, the 100% stress counter will display the stress at 100% elongation, the 200% stress counter will display the stress at 200% elongation, the 300% stress counter will display the stress at 300% elongation and the 400% and 500% stress counters will display zero. In addition, a maximum stress counter may be included and will record and display the stress at failure of the sample.

The control of the relay HR is best illustrated by FIG. 14 which has been previously described. Specifically, relay HR is a rate of change of phase relay which measures the rate of change of phase of one input signal with respect to another input signal and operates only when that rate of change of phase exceeds a certain amount. The signals being compared are a standard AC source having terminals BX, NX and the output of amplifier-chopper 197. The relay HR is set so that the rate of change of phase necessary to cause it to operate is so high that it will only operate upon the failure of the specimen 24. Accordingly, relay HR is normally in one condition and operates the other conditions only upon failure of the specimen.

As will become apparent subsequently in this description, the operation of the relay HR not only discontinues further counting and clears the unused counters, but it will stop and reverse the main drive motor M1, will cause the valves to the jaws 140 and 146 to operate to an open position to release the broken sample 24, will cause the motors M3 and M10 to operate to return the carriages 196 and 204 to their initial starting position, will condition the thickness gauge 14 for a new measurement and will institute the transcription of the data on the readout counters if such transcribing mechanism is incorporated in the device.

*Control circuitry and mode of operation*

While any suitable power source may be employed to energize the various motors and control mechanisms included herein, as shown in FIG. 15, the main power supply for the apparatus 10 is a conventional AC source which is controlled by a main manually operable switch ES. The output from the source and switch is connected to the two terminals BX and NX. When the switch ES is closed, energy is supplied to the thermal element of a thermal relay TT2 over a circuit that may be traced from the terminal BX, through the thermal element of relay TT2 to the terminal NX. At the same time, energy is supplied to a warning lamp LW by a circuit which may be traced from the terminal BX, over the back contact of the thermal relay TT2, through the lamp LW to the terminal NX. Accordingly, upon the closing of switch ES, the lamp LW will be immediately lighted to warn the operator not to endeavor to operate the machine for a predetermined time interval dependent upon the characteristic of relay TT2. This waiting time interval is for the purpose of giving various electronic control circuits not forming a part of this invention sufficient time to warm up so that their associated mechanisms will operate in a proper manner. After a predetermined time interval, relay TT2 will operate to open its back contact and thereby de-energize the waiting lamp LW and energize a ready lamp LR over a circuit which may be traced from the terminal BX, over the front contact of the relay TT2, through the lamp LR to the terminal NX. This will indicate that the machine is ready for operation.

Simultaneously with the energization of the ready lamp LR as above described, a circuit will be established for energizing the "power on" relay R6 which circuit may be traced from the terminal BX, over the front contact of the relay TT2, and through the winding of the relay R6 to the terminal NX. Accordingly, the relay R6 will pick up to close its front contacts a, b and c. Upon the closing of the contact a, a DC source will be connected into circuit, which DC source may be traced from the positive terminal of the battery 192, (although other types of DC power supplies may be employed) over the front contact *a* of the relay R6 to the positive terminal B of the DC power supply, the negative terminal of the battery is connected to the negative terminal N of the DC supply. Similarly, a second "power on" relay R7 will be energized by a circuit which may be traced from the terminal BX, over the front contact *b* of relay R6, and through the winding of the relay R7 to the terminal NX. Accordingly, relay R7 will pick up.

With the apparatus conditioned to operate with its power supplies turned on and connected in, let it further be assumed that there has been a previous operation of the machine which operation resulted in the failure of a specimen 24, which failure would have caused the phase sensitive relay HR to operate to pick up. When the phase sensitive relay picked up, it would have closed its contacts *a* and *b*, whereby to have established an energizing circuit for the relays RA and RB in series, which energizing circuit may be traced from the terminal BX, through the winding of the relay RB, over the front contact *a* of the relay HR, over the front contact *b* of the relay HR, and through the winding of the relay RA to the terminal NX. This would have caused both relays RA and RB to pick up and thereby establish a stick or holding circuit, which circuit may be traced from the terminal BX, through the winding of the relay RB, over the front contact *a* of the relay RB, over the front conact *a* of the relay RA, and through the winding of the relay RA to the terminal NX, whereby to hold these two relays in a picked up condition. As a result of relay RA being picked up, the relay R3 will be picked up due to its being energized over a circuit which may be traced from the terminal BX, over the front contact *a* of the relay R7, over the front contact *b* of the relay RA, and through the winding of the relay R3 to the terminal NX. With the relay R3 picked up among a number of functions performed thereby will be the establishment of an energizing circuit for the relay RR which circuit may be traced from the terminal BX, over the front contact *c* of the relay R7, through the winding of the relay RR, and over the front contact *c* of the relay R3 to the terminal NX. This will cause relay RR to pick up and thereby establish an energizing circuit for the slow acting relay TD1 which circuit may be traced from the terminal BX, over the front contact *b* of the relay RR, and through the winding of the relay TD1 to the terminal NX. Likewise the slow acting relay TD2 will also be energized in parallel with the relay TD1 over the front contact *b* of the relay RR. Accordingly, the relay TD1 will be picked up and the relay TD2 will be picked up. As will be seen hereinafter the picking up of relay TD1 will condition a relay R4 for energization upon the closing of the specimen indicating switch S33.

With the control apparatus in the condition above described, let it be assumed that the latching relay LR is in its released condition as shown in FIG. 15. The latching relay is of the two winding type which sticks or holds in the last position of operation should the relay become de-energized. In order to operate it from one position to the other, the opposed winding must actually be energized. For example, if the latching relay is in its down or dropped position, when energy is taken off of the lower or D coil, the relay will remain in its dropped or down position. In order to operate it to its picked up position, it will be necessary to energize its upper or U winding. Once so energized when energy is taken off of the U winding the relay LR will remain in its picked up position until its lower or D winding is once again energized.

Assuming the relay LR to be in its dropped or down position, a circuit is established to move the pusher 30 in a reverse direction towards the limit switch S13 which circuit may be traced from the terminal BX, over the back contact *a* of the relay LR, and through the reverse winding R of the motor M4 to the terminal NX. This will energize the motor M4 in such a direction as to move the pusher 30 back. This situation will continue until the rear edge 62 of the pusher 30 engages the operating member 60 of the switch S13 to thereby close the switch S13 and establish an energizing circuit for the upper winding U of the relay LR. This energizing circuit may be traced from the terminal BX, over the front contact *a* of the relay R7, over the now closed limit switch S13, and through the winding U of the relay LR to the terminal NX. This will cause the relay LR to pick up and thereby open the energizing circuit for the reverse winding R of the motor M4 and establish an energizing circuit for the forward winding F of the motor M4, which forward directed energizing circuit may be traced from the terminal BX, over the front contact *a* of the relay LR, over the limit switch S31 which is closed, and through the forward winding of the relay M4 to the terminal NX. Accordingly, the pusher will be reversed in direction and will commence moving forwardly towards the gauge 14.

Assuming no specimen 24 to be disposed on the supporting surface 22 of the feed mechanism 12, when the pusher 30 has been moved forwardly by the motor M4 sufficiently far to cause the actuator 68 to engage the operating members 64 and 66 of the limit switches S30 and S31 to operate those switches to close the switch S30 and open the switch S31, the opening of the switch S31 will open the energizing circuit for the forward winding of the motor M4 and thereby stop the forward movement of the pusher 30. Moreover, an energizing circuit will be established for the D winding of the relay LR which circuit may be traced from the terminal BX, over the front contact *a* of the relay R7, over the back contact *a* of the relay R4, over the now closed contact of the limit switch S30, and through the winding D of the relay LR to the terminal NX. The energization of the D winding of the relay LR will cause that relay's contacts to drop and thereby reestablish the reverse energizing circuit for the motor M4 to once again move the pusher in a reversed direction.

However, if a specimen 24 is disposed in front of the pusher 30, at the time that the limit switches S30 and S31 are operated by the actuation member 68 on the pusher 30, the limit switch S33 will be actuated by the specimen 24. The operation of the switch S33 by the specimen 24 will establish an energizing circuit for the relay R4, which circuit may be traced from the terminal BX, over the front contact *c* of the relay R7, over the front contact *a* of the relay TD1, over the now closed contact of the limit switch S33, and through the winding of the relay R4 to the terminal NX. Thus the relay R4 will pick up to open the previously traced energizing circuit for the D winding of the relay LR and thereby prevent relay LR from operating to its dropped position to reverse the motor M4. Accordingly relay LR will remain picked up and the motor M4 will be de-energized both in the forward and reverse directions and the pusher will stop.

With the specimen in front of the pusher 30 and actuating the limit switch S33 to energize relay R4, the specimen is in position to have its thickness measured by the gauging mechanism 14. The picking up of relay R4 commences the gauging operation by closing an energizing circuit through a thermal time delay relay TT1 which energizing circuit may be traced from the terminal BX, over the front contact *c* of the relay R7, over the front contact of the relay TD1, over the front contact *b* of the relay R4 which is now energized, and through the heating element of the relay TT1 to the terminal NX. After a suitable time delay, the relay TT1 will operate its contact to a closed condition whereby to energize a cam motor CM associated with the gauge.

The purpose of the cam motor CM is to control four switches S35, S36, S37 and S38 which are associated with the thickness gauging apparatus 14. As best shown in FIG. 13, the cam motor CM has an output shaft 350 on which two cams 352 and 354 are fixed. When the motor CM is energized, it will rotate shaft 350 in a clockwise direction as viewed in FIG. 13 to thereby operate the switches S35, S36, S37 and S38 in a predetermined time sequence during one complete rotation of the shaft. For example, at the beginning of the gauging cycle, the cams 352 and 354 are in the positions shown in FIG. 13. In the illustrated position, the switch S37 will be open by virtue of its engagement with a high point 356 on cam 352. The switch S38 will also be open but will close when it is engaged by the high point 356 near the completion of the gauging cycle. Switches S35 and S36, which are controlled by the spiral cam 354, are both open at this time.

When the motor CM becomes energized by the closing of the contact of the relay TT1, motor CM will commence turning its shaft 350 and thereby rotate the cams 352 and 354 in a clockwise rotation. The first thing that will occur will be the moving of high point 356 of cam 352 out of engagement with limit switch S37 to close the limit switch to provide for the bridging of the contact of the thermal relay TT1 and thereby establish a second energizing circuit for the motor CM (see FIG. 15). Secondly, the cam 354 will rotate sufficiently to cause the closing of the limit switch S36, whereby to operate switch S36 from its open to its closed condition to thereby establish an energizing circuit for the brake solenoid GSB to withdraw the brake from the shaft 124 to thereby release the pointer 130 and the pointer shaft 134 from the positions they assumed during their previous measurement. This circuit may be traced from the terminal BX, over now closed limit switch S36 through the winding of brake solenoid GSB to terminal NX. Just after the release of the brake solenoid GSB, the discontinuity 358 in the otherwise spiral surface of cam 354 will move past limit switch S35 to cause the limit switch S35 to operate to its closed position to thereby energize the solenoid valve GSV that is interposed in the hoseline 80 to open the air supply to the vessel 72 and thereby commence the operation of air servo 86 as previously described. This will cause the vessel 72 to move downwardly and position itself above the upper surface of the specimen 24 being gauged so as to measure the thickness of the specimen as previously described. After the completion of the measurement of the thickness of the specimen 24, the cam 354 which continues to rotate along with cam 352 throughout the thickness measuring procedure to move discontinuity 358 past switch S36 to reopen that switch and thereby de-energize the brake solenoid GSB so as to apply the brake 132 to the shaft 124 and lock the shaft in the measured condition. Subsequently, a sufficiently high point on cam 354 will move under the actuator of the limit switch S35 to thereby cause that limit switch to operate to an open position to de-energize the solenoid valve GSV controlling the air pressure source and thereby cut off the supply of pressure to the vessel 72. This will cause the vessel 72 to be raised out of interfering relation with future movement of the specimen 24.

At about the time that the solenoid valve GSV is closed, high point 356 on cam 352 will operate switch S38 to its closed condition to establish an energizing circuit for a relay R5 which energizing circuit may be traced from the terminal BX, over the front contact c of the relay R7, over the front contact a of the relay TD1, over the now closed contact of the limit switch S38, and through the winding of the relay R5 to the terminal NX. This will cause the relay R5 to pick up and close its front contacts whereby to establish a stick or holding circuit that is idenitical with its energizing circuit save that the front contact a of the relay R5 bridges the contact of the limit switch S38. Accordingly, upon continued rotation of the cams 352 and 354, the limit switch S38 will be reopened by becoming disengaged from the high point 356 but this will not effect the energization of the relay R5 which will now be energized over its stick circuit. Upon the picking up of the relay R5, a second energizing circuit for the forward winding of the motor M4 will be established, which energizing circuit may be traced from the terminal BX, over the front contact a of the latching relay LR, over the front contact b of the relay R5, over the closed contact of the limit switch S34, to the forward winding of the motor M4 to the terminal NX. Accordingly, the motor M4 will become re-energized in the forward direction notwithstanding the fact that the limit switch S31 is open. This will cause the pusher 30 to push the specimen 24 away from the thickness gauge 14 and into the open jaws 140 and 146 of the stretching mechanism. The movement of the specimen 24 out from the gauge as just described will cause the opening of limit switch S33 whereby to open the energizing circuit for the relay R5 to thereby cause it to release and open the energizing circuit for the relay R4 to thereby cause it to release and open the energizing circuit for the thermal time delay relay TT1. This will de-energize the thermal delay relay TT1 to cause it to release and open its contact, but the motor CM will remain energized until the high point 356 of cam 352 re-engages limit switch S37 to open the limit switch and thereby open the second energizing circuit for the motor CM. At this point the motor CM will become de-energized in what was its initial or starting position. It will remain that way until the next specimen 24 is moved into the gauge for thickness measurement.

The motor M4 will continue to rotate in its forward direction to move the pusher 30 toward the jaws of the stretching mechanism until an upstanding actuator 360 secured to the pusher 30 engages a limit switch S32 that is fixed to the frame of the machine (FIG. 1). Upon the operation of the switch S32, its two contacts a and b will become closed. The closing of the contact a of the switch S32 will establish a second energizing circuit for the D winding of the latching relay LR which circuit may be traced from the terminal BX, over the front contact a of the relay R7, over the back contact a of the relay R4 that is now de-energized, over the contact a of the limit switch S32 which is now closed, and through the winding D of the relay LR to the terminal NX. This will operate the contacts of the relay LR to their dropped position whereby to re-establish the energizing circuit for the reverse winding of the motor M4 to commence the rearward or return movement of the pusher 30.

The closing of the contact b of the limit switch S32 together with the dropping of relay LR will establish an energizing circuit for the relay RD, which circuit may be traced from the terminal BX, over the contact b of the limit switch S32, over the back contact b of the now released latching relay LR, and through the winding of the relay RD to the terminal NX.

With the relay RD picked up, the terminal BX of the power source will be applied to right hand terminal of the relay RB as well as to the lefthand terminal thereof. Relay RB is normally energized by a circuit in which the terminal BX is applied only to the lefthand terminal of the relay RB as viewed in FIG. 15. However, when relay RD picks up as just described, the terminal BX is applied to the righthand terminal of the relay RB by a circuit which may be traced from the treminal BX, over the front contact b of the relay RD, and over the front contact a of the relay RB to the righthand terminal of the relay RB. Accordingly, there is effectively no voltage across the winding of the relay RB and that relay will release to condition the photodiodes PD1 and PD2 to energize the counters by disconnecting the low impedance grounding circuits including the front contacts b and c of relay RB and resistors Z1 and Z2 from the photodiodes. However, the relay RA, which was previously energized in series with the relay RB will remain energized over a circuit which may be traced from the terminal BX, over the front contact a of the relay RD, over the front contact a of the relay RA, and through the winding of the relay RA, to the terminal NX.

With the latching relay LR in the down position and the motor M4 energized in a reverse direction, the pusher 30 will move in a reverse direction and thereby disengage itself from the limit switch S32 whereby to reopen the limit switch and accordingly de-energize the relay RD which will release and thereby open the energizing circuit for the relay RA. Accordingly, the relay RA will release and will open the previously traced energizing circuit for the relay R3 at the contact b of the relay RA. Accordingly, relay R3 will release. The release of relay R3 will open the previously traced energizing circuit for the relay RR at now open front contact c of the relay R3. Accordingly, relay RR will also release to open its front contacts and close its back contacts.

The dropping of the relay RR will perform a number of functions. First, it will immediately close an energizing circuit to the solenoid valve V1 which will close the jaws 140 and 146 with light pressure. The energizing circuit for the solenoid valve V1 may be traced from the terminal BX, over the back contact b of the relay RR and through the winding of solenoid valve V1 to the terminal NX. The energization of valve V1 as just stated, will lightly shut the jaws 140 and 146 to softly or mildly hold the ends of the sample or specimen 24 for a reason which will become apparent hereinafter. At the same time the release of relay RR will de-energize relays TD1 and TD2, but these relays will not immediately drop due to their slow acting nature. Also, the release of relay RR will energize slow acting relay TD3 which will not pick up immediately due to its slow acting nature. Lastly, the release of relay RR will establish an energizing circuit for motor M1 in the forward direction, which circuit may be traced from the positive terminal BX of the power source, over the front contact c of the relay R7, over limit switch S15 which is normally closed and which opens only under emergency conditions, over manually closed switch S4, over back contact a of relay RR, over limit switch S18 which is now closed, and through the forward winding of the motor M1 to the terminal NX. This will start the motor M1 moving in a forward or stretching direction, which direction is viewed as being to the left in FIG. 1. Just as motor M1 starts to stretch the specimen 24, relays TD1 and TD2 will release whereby to open the energizing circuit to the feeler solenoids 226 and 246 which circuit may be traced from the terminal BX, over the front contact c of the relay R7 over the front contact a of the relay TD1, and through the feeler solenoids 226 and 246 in parallel to the terminal NX. The release of the solenoids will permit the feelers 220 and 242 to drop down onto the specimen surface as already described.

The picking up of relay TD3 will establish an energizing circuit for a solenoid valve V2 to thereby cause the jaws 140 and 146 to apply full clamping pressure on the specimen 24. The energizing circuit for the solenoid valve V2 may be traced from the terminal BX, over the front contact c of the relay R7, over the front contact of the relay TD3, and through the solenoid valve V2 to the terminal NX. This will actuate the solenoid valve V2 to apply full clamping pressure.

It will be noted that the clamping pressure applied by the jaws 140 and 146 to the specimen 24 is applied in two discrete steps, first light clamping pressure and then full clamping pressure. The reason for this is to prevent possible buckling of specimen which might result from the application of full clamping pressure in advance of mild tension. Such buckling could result in spurious test data. The two step application of clamping pressure avoids this problem.

With the forward winding motor M1 energizing over its previously traced energizing circuit, lead screw 156 will be rotated so as to move movable jaw 146 and carriage 194 to the right as viewed in FIG. 7 to stretch specimen 24 gripped between the jaws 140 and 146. As carriages 196 and 204 are connected to carriage 194 through chains 274 and 262, respectively, this rightward movement of carriage 194, as viewed in FIG. 7, will result in a similar rightward movement of the carriages 196 and 204, whereby to close limit switch S20 which is open only when the carriage 204 is in its initial or starting condition (see FIG. 6). As carriages 196 and 204 are moving to the right at a more rapid rate than their associated feelers 242 and 220, respectively, the feelers and the supporting shafts will move to the left relative to their associated carriages as viewed in FIG. 7. This relative leftward movement of the feelers 220 and 242 will close contact CW11 and open contact CW12. This operation will cause cats whisker repeater relay R11 to become energized and cats whisker repeater relay R12 to become deenergized.

With relay R11 energized, a circuit will be established for energizing the reverse winding of motor M3 which circuit may be traced from the terminal BX, over the front contact b of the relay R7, over the now closed limit switch S20, over the closed contact b of manual switch S6, through the reverse winding of the motor M3, over the front contact of the relay R11, and over the back contact b of the relay R3 to the terminal NX. This will cause motor M3 to operate in a reverse direction which reverse movement of motor M3 superimposed on the forward movement of the carriage 194 will result in a slowing down (or reversal) of the rightward movement of the carriage 204 as viewed in FIG. 7, so that the feeler 220 will move more rapidly than carriage 204 and hence move to the right relative to the carriage 204. This rightward relative movement of the feeler 220 relative to the carriage will open contact CW11 and thereby establish an energizing circuit for the forward winding of the motor M3 which circuit may be traced from the terminal BX, over the front contact b of the relay R7, over the closed limit switch S20, over the closed contact b of the manual switch S6, through the forward winding of the motor M3, over the back contact of the relay R11, and over the back contact b of the relay R3 to the terminal NX. Thus motor M3 will reverse its direction and superpose its forward movement to the forward movement of the carriage 194 to move the carriage 204 more rapidly to the right to thereby cause a reclosing of the cats whisker contact CW11 and a recycling of the hunting operation as just described. In this manner carriage 204 will move to the right concomitantly with its feeler 220 but at a varying rate of speed.

The above noted opening of cats whisker contact CW12 with the initial movement of the carriages will cause repeater relay R12 to open whereby to establish an energizing circuit for the reverse winding of the motor M10 which circuit may be traced from the terminal BX, over the front contact b of the relay R7, over the closed limit switch S20, over the closed contact a of the manual switch S6, through the reverse winding of the motor M10, over the back contact of the relay R12 and over the back contact a of the relay R3 to the terminal NX. This will cause motor M10 to operate in a reverse direction which reverse operation of motor M10 superimposed on the forward movement of the carriage 194 will result in a slowing down (or reversal, if desired) of the rightward movement of the carriage 196 as viewed in FIG. 7, to thereby cause a closing of cats whisker contact CW12 and an energizing of its repeater relay R12. The picking up of relay R12 will establish a forward energizing circuit for the motor M10, which circuit may be traced from the terminal BX, over the front contact b of the relay R7, over the closed limit switch S20, over the closed contact a of manual switch S6, through the forward winding of the motor M10, over the front contact of the relay R12 and over the back contact a of the relay R3 to the terminal NX. The forward movement of the motor M10 will accelerate the forward or rightward movement of the carriage 196 whereby to cause a reopening of the cats whisker contact CW12 to initiate a subsequent recycling of the apparatus as above described. In this way carriage 196 will advance rightward as viewed in FIG. 7 an average rate substantially identical to the rate of moving feeler 242, but at varying speeds.

It will be borne in mind that while carriages 196 and 204 and all components rigidly associated with them are moving to the right, as viewed in FIG. 7, in a hunting type movement, feelers 220 and 242 are moving smoothly to the right in frictional engagement with specimen surface points 221 and 243 respectively, there being reciprocal relative movement between feelers 220 and 242, and carriages 204 and 196 on the other.

The movement of the feelers 220 and 242 and their associated carriages 196 and 204, respectively, will effect operation of the extensometer and its digital output means as already described to activate the counters or other output recording means. This action will take place continuously until the specimen 24 fails in tension. At the point of failure, the output of the amplifier-chopper 197 will change in phase relationship to the voltage applied to the terminals BX-NX so rapidly that it will cause relay HR to operate and pick up whereby to re-establish the previously traced series energizing circuit for the relays RB and RA, which energizing circuit includes both of the front contact $a$ and $b$ of the relay HR. The picking up of relay RB will cause a discontinuance of the counting of the photodiodes PD1 and PD2 by the inclusion of the grounded resistors Z1 and Z2 in circuit over contacts $b$ and $c$ of relay RB and a clearing of those stress counters indicating percent elongations not actually reached during the test. The picking up of relay RA will re-establish the energizing circuit for the relay R3 including the front contact $b$ of the relay RA whereby to cause the relay R3 to pick up and open the previously traced forward and reverse winding energizing circuits for the motors M3 and M10 at the back contacts $b$ and $a$ respectively of the relay R3. However, second forward energizing circuits for motors M3 and M10 will be established by the picking up of relay R3. The second forward energizing circuit for the motor M10 may be traced from the terminal BX, over the front contact $b$ of the relay R7, through the limit switch S20, over the closed contact $a$ of the manual switch S6, through the forward winding of the motor M10, over the limit switch S17, and over the front contact $a$ of the relay R3 to the terminal NX. The second forward energizing circuit for the motor M3 may be traced from the terminal BX, over the front contact $b$ of the relay R7, through the limit switch S20, over the closed contact $b$ of the manual switch S6, through the forward winding of the motor M3, over the limit switch S16, and over the front contact $b$ of the relay R3 to the terminal NX.

Accordingly, both motors M3 and M10 will operate in a forward direction to move the carriages 196 and 204 relatively toward carriage 164. At this time, for reasons which will become apparent, carriage 194 is moving to the right as viewed in FIG. 1. Thus, carriages 194 and 196 meet to open the limit switch S17 and thereby de-energize the second forward energizing circuit for the motor M10. Thereafter carriage 194 will continue to move to the right as viewed in FIG. 1 and will push carriage 196 in advance of it. This condition will persist until carriage 196 engages carriage 204 at which point limit switch S16 will open to open the second forward energizing circuit for the motor M3. Thereafter both carriages 196 and 204 will be pushed to the right toward their initial position until the carriage 204 engages the limit switch S20 to open that limit switch. At that point limit switch S14 will also be opened to de-energize motor M1, whereby to restore the three carriages to their initial positions for the next measurement.

Also occurring with the rupture of the specimen and, the closing of the relay R3 is the re-establishment of the energizing circuit for the reversing relay RR, whereby to re-establish the energizing circuits for the relays TD1 and TD2, which relays, after their normal time delay interval will pick up. The picking up of the relay RR will also open the energizing circuit for the relay TD3 whereby to cause that relay to release after its time delay interval. The picking up of relays TD1 and TD2 will re-establish the energizing circuits for the solenoids 226 and 246 over the front contact $a$ of the relay TD1. The picking up of the relay RR will de-energize solenoid control valves V1 and V2 whereby to open the jaws 140 and 146 to drop the ends of the broken specimen 24. The picking up of the relay TD2 will re-establish the reverse energizing circuit for the motor M1, which circuit may be traced from the terminal BX, over the front contact $c$ of the relay R7, over the limit switch S15, over the closed manual safety switch S4, over the front contact $a$ of the relay RR, over the limit switch S14, over the front contact $a$ of the relay TD2, and through the reverse winding of the motor M1 to the terminal NX. This will cause motor M1 to then rotate in a direction to turn the lead screw 156 so as to move the carriage 194 to the right as viewed in FIG. 1.

Motor M1 will continue operating in a reverse direction for moving the carriages 194, 196 and 204 to the right as viewed in FIG. 1 until those carriages are restored to their initial specimen receiving positions at which point limit switches S14, S16, S17 and S20 will all be open as already described whereby to de-energize the main drive motor M1 as well as motors M3 and M10, to thereby restore the stretching mechanism and extensometer to their initial conditions. This will restore the apparatus 10 to the initially described condition wherein it is prepared to receive another specimen 24 for subsequent testing. Until another specimen is actually placed on the surface 22 of the feed mechanism 12, the pusher 30 will reciprocate back and forth as already described. However, once a specimen is so located on the pusher the apparatus will repeat the above described series of operations.

While I have herein shown and described the preferred form of the present apparatus and have suggested modifications therein, other changes and modifications may be made therein within the scope of the appended claims without departing from the spirit and scope of this invention.

What I claim is:

1. Apparatus for automatically tensile testing a specimen of highly stretchable material, comprising
   a pair of relatively movable means for gripping opposite ends of a specimen;
   means for disposing said specimen with said opposite ends in said gripping means;
   means responsive to the initial thickness of said specimen for adjusting a parameter of the apparatus in accordance therewith;
   means for imparting relative movement to said pair of gripping means from and to a first closely spaced relative position and to and from a second more distant relative position,
   means for controlling said last mentioned means for preventing relative movement of said gripping means away from said first relative position unless said means for disposing said specimen has operated for disposing said specimen with its ends in said gripping means;
   means for measuring the elongation of a portion of said specimen while at least one of said gripping means is moving away from said first position;
   and means operatively connected to one of said gripping means and responsive to the load thereon and to said adjusted parameter for indicating the stress on said specimen.

2. The tensile testing apparatus of claim 1, wherein said gripping means comprise openable and closable jaws for clamping the ends of said test specimen, and further comprising means for opening and closing said jaws, and means for controlling the opening and closing of said jaws for permitting the closing of said jaws only when a specimen is disposed with its ends between said jaws.

3. The tensile testing apparatus of claim 2, wherein said means for opening and closing said jaws includes means for closing said jaws with a mild clamping pressure and means for closing said jaws with a relatively strong clamping pressure, and said means for controlling the opening and closing of said jaws includes means for actuating said mild clamping pressure means in advance of said strong clamping pressure means, said strong clamping pressure means being actuated only after said pair of gripping means moves away from its first position.

4. The tensile testing apparatus of claim 1, wherein said means for controlling includes means for determining the presence of a specimen in said gripping means, and said means for controlling prevents relative movement of said gripping means away from said first relative position unless a specimen is present in said gripping means.

5. The tensile testing apparatus of claim 1, wherein said elongation measuring means comprises a pair of spaced apart relatively movable feelers associated with a pair of like spaced apart points on a test specimen, a pair of supports for movably supporting said feelers, a pair of motor means, one for each feeler support and separate from the means for imparting relative movement to said gripping means, for moving said feeler supports in substantial unison with the movement of said points associated with the respectively supported feelers.

6. The tensile testing apparatus of claim 5, further comprising a pair of contacts, one associated with each feeler support, means for opening and closing each of said contacts in response to relative movement between the associated feeler support and its feeler, and energizing circuit means for each of said pair of motor means including the contact of said pair of contacts associated with the feeler support moved by said motor means.

7. The tensile testing apparatus of claim 6, said motor means being reversible, and said energizing circuit means including a forward and a reverse energizing circuit for each of said motor means, said forward energizing circuit being closed only when said associated contact is in one condition and said reverse energizing circuit being closed only when said associated contact is in its other condition.

8. The tensile testing apparatus of claim 5, and means for measuring the relative movement between said feeler supports, whereby to measure the elongation of the test specimen between said spaced apart points.

9. The tensile testing apparatus of claim 8, said movement measuring means comprising a disc having an arcuated row of perforations, means for rotatably mounting said disc on one of said feeler supports, an elongated member connected to the other of said feeler supports for substantially concomitant movement therewith, said elongated member operatively engaging said disc to rotate same when there is relative motion therebetween, whereby to rotate said disc in proportion to the relative movement between said feeler supports, a light source on one side of said perforated disc in register with the path of travel of the perforations therein, and photoresponsive means on the other side of said disc in register with said path of travel of said perforations and with said light source.

10. The tensile testing apparatus of claim 1, wherein said means for disposing said specimen comprises an elongated support means for a test specimen extending transversely of the direction of relative movement of said gripping means, and a reciprocally operable pusher member movable longitudinally of said support means and engageable with a sample thereon for pushing said sample into position with its ends in said gripping means, and means for moving said pusher member.

11. The apparatus of claim 1, further comprising a first control means for said gripping means for causing said gripping means to apply relatively light clamping pressure, a second control means for said gripping means for causing said gripping means to apply relatively heavy clamping pressure, and means for actuating said first control means effective not later than the actuation of said movement imparting means, and means for actuating said second control means effective only after the actuation of said movement imparting means.

12. The apparatus of claim 1, further comprising means for sensing the failure of a specimen, and means for moving said gripping means to said first relative position including said failure sensing means and actuated thereby.

13. Apparatus for measuring the stress on a test specimen comprising,
electrical circuit means for developing an impedance change representative of the stress producing force,
means responsive to the intial thickness of said test specimen for adjusting a parameter of the apparatus in accordance therewith,
and means responsive to said impedance change and to said adjusted parameter for indicating the stress on said test specimen.

14. The stress measuring apparatus of claim 13, wherein said circuit means for developing an impedance change comprises impedance means which changes impedance in a manner representative of the stress producing force, which apparatus includes means for applying an input voltage to said circuit means for developing an impedance change, and wherein said thickness-responsive means includes means for adjusting said input voltage to said circuit means for developing an impedance change in accordance with the initial thickness of said specimen.

15. The stress measuring apparatus of claim 13, wherein said circuit means for developing an impedance change comprises a load cell resistance bridge which has an input circuit and which changes resistance in a manner representative of the stress producing force, and wherein said thickness-responsive means is coupled into said input circuit for said bridge, said thickness-responsive means including an adjustable resistor, and means for adjusting said adjustable resistor in accordance with the initial thickness of said test specimen.

16. The stress measuring apparatus of claim 13, in which said means for indicating stress includes means for digitizing the indication of stress.

17. The stress measuring apparatus of claim 13, wherein said stress-indicating means comprises a self balancing potentiometer having an adjustable slide, circuit means for coupling said circuit means for developing an impedance change to said self balancing potentiometer, a perforated member operatively connected to said slide of said self balancing potentiometer for movement therewith, a light source on one side of said member in register with the path of movement of the perforations therein, and light-responsive means on the other side of said member in register with the path of movement of said perforations and with said light source.

References Cited

UNITED STATES PATENTS

| 2,286,286 | 6/1942 | Laystrom et al. | 73—95 |
| 2,612,774 | 10/1952 | Zener et al. | 73—89 |
| 2,827,705 | 3/1958 | Elliott et al. | 73—89 |
| 2,904,993 | 9/1959 | Grover et al. | 73—15.6 |
| 3,220,250 | 11/1965 | Strandquist et al. | 73—95 |

FOREIGN PATENTS

| 136,947 | 7/1960 | U.S.S.R. |
| 891,232 | 3/1962 | Great Britain. |

JAMES J. GILL, Primary Examiner.

J. W. MYRACLE, Assistant Examiner.

U.S. Cl. X.R.

73—89

PO-1050
(5/69)

UNITED STATES PATENT OFFICE
CERTIFICATE OF CORRECTION

Patent No. 3447363      Dated June 3, 1969

Inventor(s) George Goldfinger

It is certified that error appears in the above-identified patent and that said Letters Patent are hereby corrected as shown below:

column 24, line 15 for "intial" read "initial"

SIGNED AND
SEALED
JAN 20 1970

(SEAL)
Attest:

Edward M. Fletcher, Jr.
Attesting Officer

WILLIAM E. SCHUYLER, JR.
Commissioner of Patents